US007074299B2

(12) United States Patent
Chou et al.

(10) Patent No.: US 7,074,299 B2
(45) Date of Patent: Jul. 11, 2006

(54) PROCESS FOR USING A PHLOROGLUCINOL COLOR DELTA TO CONTROL BLENDING, DEINKING AND BLEACHING OF GROUNDWOOD-CONTAINING SECONDARY PULP

(75) Inventors: Henry Chou, Neenah, WI (US); Hazen C. Thomas, Green Bay, WI (US); Andrew C. Palm, Menasha, WI (US); Terry P. Witkowski, Neenah, WI (US); Robert J. Clausing, Neenah, WI (US); Stephanie Keen, Appleton, WI (US); David J. DiPietro, Appleton, WI (US)

(73) Assignee: Fort James Corporation, Atlanta, GA (US)

( * ) Notice: Subject to any disclaimer, the term of this patent is extended or adjusted under 35 U.S.C. 154(b) by 310 days.

(21) Appl. No.: 10/425,856

(22) Filed: Apr. 29, 2003

(65) Prior Publication Data

US 2004/0079497 A1    Apr. 29, 2004

Related U.S. Application Data

(60) Provisional application No. 60/377,068, filed on May 1, 2002.

(51) Int. Cl.
*D21C 5/02* (2006.01)
*D21C 9/10* (2006.01)
*G01N 21/25* (2006.01)
*D21H 11/08* (2006.01)
*D21H 11/14* (2006.01)

(52) U.S. Cl. .............................. 162/49; 162/4; 162/62

(58) Field of Classification Search .................... 162/6, 162/49, 40, 4, 62, 238; 209/509, 580, 155
See application file for complete search history.

(56) References Cited

U.S. PATENT DOCUMENTS

| 5,013,404 | A | * | 5/1991 | Christiansen et al. ......... 162/72 |
| 5,562,803 | A | | 10/1996 | Wang et al. .................... 162/5 |
| 5,672,247 | A | * | 9/1997 | Pangalos et al. .............. 162/65 |
| 5,736,004 | A | * | 4/1998 | Pangalos et al. .............. 162/49 |
| 5,755,926 | A | | 5/1998 | Hankins et al. ................ 162/6 |
| 5,883,233 | A | * | 3/1999 | Catlin et al. ................. 534/689 |
| RE36,424 | E | | 12/1999 | Clement ......................... 162/5 |
| 6,010,593 | A | | 1/2000 | Eymin Petot Tourtollet et al. .............. 162/4 |
| 6,019,872 | A | | 2/2000 | Kurrle ......................... 162/140 |
| 6,153,300 | A | * | 11/2000 | Stromberg et al. .......... 428/393 |
| 6,273,994 | B1 | * | 8/2001 | Creber et al. ................. 162/49 |

* cited by examiner

Primary Examiner—Steven P. Griffin
Assistant Examiner—Anna L. Kinney
(74) Attorney, Agent, or Firm—Michael W. Ferrell

(57) ABSTRACT

A method of processing papermaking fiber includes characterizing the initial color of the pulp and the color of the pulp after treatment with a phloroglucinol stain. The color response of the pulp to the stain has been found to be a better indicator of processing needs for secondary pulps in particular and in any event is selective for untreated groundwood as opposed to conventional groundwood identification methods. The color difference is used to target a suitable product for the pulp, to aid in bleaching/deinking strategy or to enable optimization of fiber blending for particular products. In a preferred embodiment the process includes determining changes in CIE L*, a*, b* and brightness values before and after staining of the pulp.

39 Claims, 26 Drawing Sheets

DELTA a* VERSUS KAPPA NUMBER a* VERSUS KAPPA NUMBER

DELTA b* VERSUS KAPPA NUMBER b* VERSUS PERCENT GROUNDWOOD b* VERSUS KAPPA NUMBER

DELTA L* VERSUS PERCENT GROUNDWOOD

DELTA L* VERSUS KAPPA NUMBER

L* VERSUS KAPPA NUMBER

DELTA BRIGHTNESS VERSUS PERCENT GROUNDWOOD

DELTA BRIGHTNESS VERSUS KAPPA NUMBER

BRIGHTNESS VERSUS KAPPA NUMBER

NORMALIZED DERIVATIVES

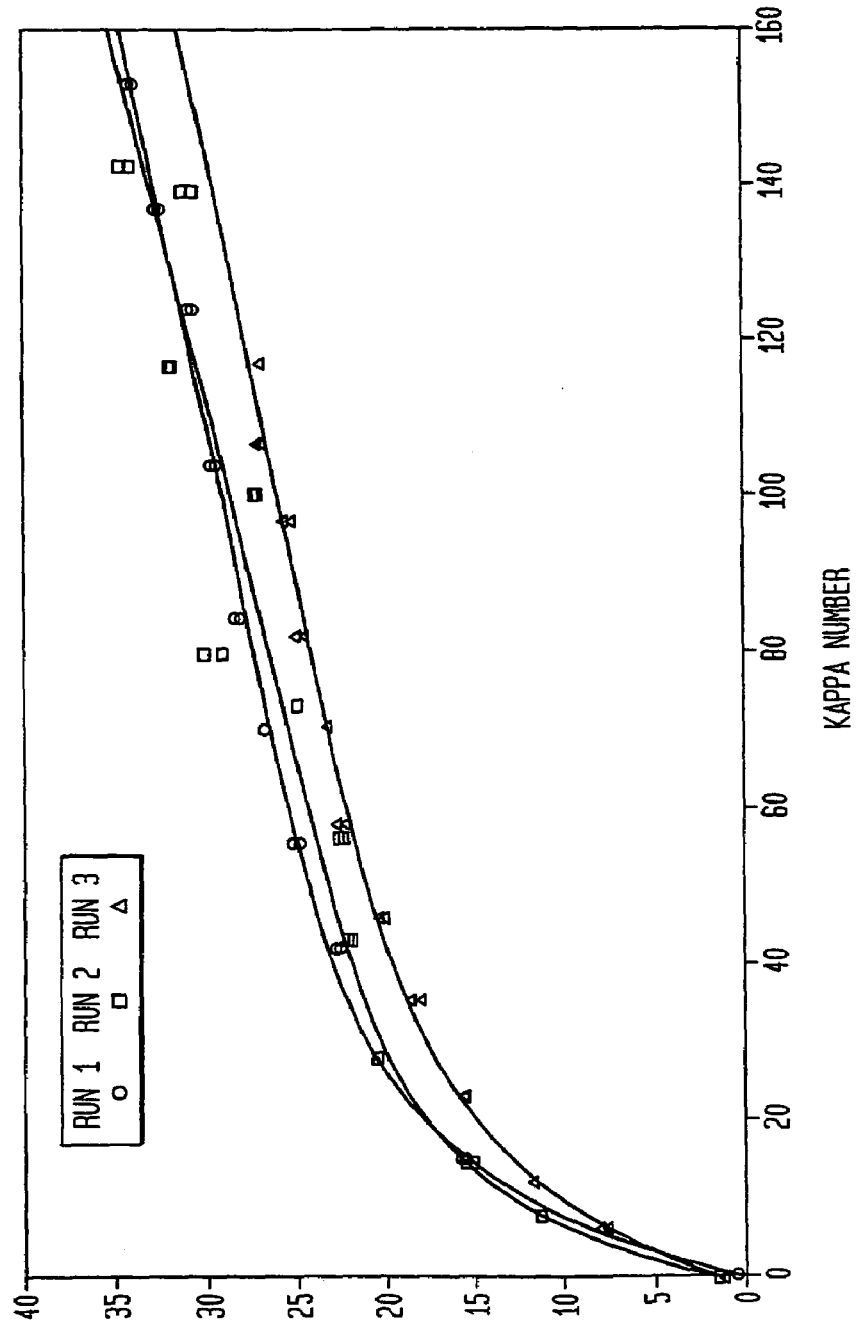

PROCESS FOR USING A PHLOROGLUCINOL COLOR DELTA TO CONTROL BLENDING, DEINKING AND BLEACHING OF GROUNDWOOD-CONTAINING SECONDARY PULP

CLAIM FOR PRIORITY

This non-provisional application claims the benefit of the filing date of U.S. Provisional Patent Application Ser. No. 60/377,068, of the same title, filed May 1, 2002.

BACKGROUND

Field of Invention and Prior Art

This application relates, in preferred embodiments, to recycling waste paper. Before waste paper can be reused, it is subject to pulping, deinking and bleaching processes. The cost of the waste paper and bleaching processes constitute a major part of the manufacturing cost for the production of paper products. Prior art methods controlled deinking and bleaching based upon the brightness of the incoming fiber with the attempt being made to deink and then bleach to a target brightness level.

Recycling is all the more difficult with respect to waste paper grades containing substantial amounts of groundwood fiber, also known as high lignin containing fiber. In recent years, waste paper costs have increased and the availability of low lignin waste paper has decreased. Thus, to continue economic operations of the large mills, the relatively plentiful high lignin containing waste paper and pulp feedstock has to be employed, especially with respect to economy or away-from-home tissue and towel products.

We have discovered a spectrophotometric and staining process which can be utilized in a short period of time, usually less than ten minutes in a commercial setting to enable us to evaluate what deinking and bleaching process to employ on the pulp. It should be noted that our process does not register colorless chemically treated fibers as groundwood. This is one shortcoming of the commonly used TAPPI Method T 236 om-99 for determining Kappa numbers. The TAPPI Method does not distinguish between untreated and treated lignin in fibers and therefore forces the use of excess chemical treatment for pulp which is suitable for the manufacture of absorbent paper products. This is particularly problematic since bleached-chemithermomechanical pulp (BCTMP) constitutes a significant part of the recycle fiber supply. The TAPPI Method also takes more than twice as long as the process claimed herein to determine the amount of groundwood in the pulp. The TAPPI Method is therefore impractical for use in large scale paper making operations.

Illustrating the state-of-the-art generally with respect to repulping, deinking and bleaching wastepaper-derived secondary furnish are U.S. Pat. No. RE36,424 to Clement; U.S. Pat. No. 5,562,803 to Wang; U.S. Pat. No. 5,755,926 to Hankins et al.; U.S. Pat. No. 6,010,593 to Tourtollet et al. and U.S. Pat. No. 6,019,872 to Kurle, the disclosures of which are hereby incorporated by reference.

SUMMARY OF THE INVENTION

Our process includes staining handsheets of incoming pulp from waste paper with phloroglucinol and then measuring the color value of the stained handsheet using conventional Gretag-Macbeth Spectrophotometer to provide CIE L*, a* and b* color measurements and brightness numbers. CIE refers to the International Commission on Illumination and a*, b* and so forth refer to values using CIE standards. These measurements enable us to maximize the use of wastepaper in the manufacture of absorbent paper sheet. This process comprises preparing a pulp from recycle furnish to form secondary fiber and preparing an absorbent sheet from said secondary papermaking fiber, characterizing the initial color of said absorbent sheet, staining said absorbent sheet with a phloroglucinol stain and characterizing the color of said absorbent sheet. The process includes comparing the color of the stained sheet with initial color and selecting a target paper product based on the comparison. Advantageously the characterization comprises a parameter selected consisting of a lightness parameter, a red green parameter and a yellow blue parameter.

Suitably CIE L*, a*, b* and brightness values are used to determine the percent groundwood in the feedstock. This is preferably done by obtaining delta L*, delta a*, delta b* and brightness values as shown in FIGS. 1–3, 12–13, 15–16 and 19–20. As used herein (unless otherwise indicated) percent groundwood refers to the amount of mechanical pulp present in a mixture of Kraft pulp and mechanical pulp (dry wt. %)

We have discovered that delta a*, delta b*, delta L* and delta brightness values are especially suitable in determining untreated groundwood content in the sheet and thus the suitability of the pulp for predetermined commercial applications. A suitable delta a* range is 0–20, a suitable delta L* range is 0 to 28, a suitable delta b* range is −2 to 17 and a suitable delta brightness range is 5 to 31 to produce 60 to 85 GE brightness pulp.

As stated above, we have discovered that unbleached groundwood content (high lignin containing fiber) correlates very closely with the change in the delta a*, delta b*, delta L* and delta brightness value using the spectrophotometer before and after staining of the handsheets. A delta a* value of less than 10, 10–20 and over 20 provide guidance as to the bleaching and deinking process to employ to obtain paper products exhibiting GE brightness values of 60 to 85. For example, when the delta a* value is 20 or above, the optimum use of the pulp is as unbleached brown stock (having a GE brightness of about 40) or semi-bleached stock (having a GE brightness generally less than about 60 but in some cases up to 68–75). When the unbleached groundwood content of the incoming pulp is very low, having a delta a* of 10 or less then a conventional delignifying bleaching process such as a hypochlorite bleaching process is used to produce 60 to 85 GE brightness paper products. When the unbleached groundwood content of the incoming pulp has a delta a* of about 10–20, then a non-delignifying bleaching process is used to produce a 60 to 85 GE brightness paper product. The following Table 1 provides the approximate bleaching process selection based on delta a*, delta b*, delta L*, and delta brightness values:

TABLE 1

Bleaching Process Selection Based on delta a*, delta b*, delta L*, and delta brightness

| Bleaching Process | delta a* | delta b* | delta L* | delta brightness |
|---|---|---|---|---|
| Delignifying | <10 | <7 | <14 | <21 |
| Non-delignifying | 10–20 | 7–17 | 14–28 | 21–31 |
| Non-delignifying/No Bleaching | >20 | >17 | >28 | >31 |

As referred to at Table 1, a delignifying bleaching process is typically a bleaching process involving treating the pulp with hypochlorite. Non-delignifying bleaching processes are typically bleaching processes involving treatment with peroxides and/or hydrosulfites. At delta a* values of 10–20 one might utilize a moderate amount of hydrosulfite and/or peroxide while at delta a* values of 20 or more hydrosulfite and/or peroxide may be more heavily used. When pulp has a delta a* of more than 20 it is advantageously employed in semi-bleached products, those where the finished pulp has a GE brightness of 68–75 for example. Delignifying bleaching such as hypochlorite bleaching is normally used if the unbleached groundwood content in the incoming pulp is less than 5% (a delta a* value less than 10) and a 60 to 85 GE brightness paper is desired.

EOP/Y is a typical non-delignifying bleaching that is normally used if the unbleached groundwood content in the incoming pulp is between 5% and 20% (a delta a* value between 10 and 20) and a 60 to 85 GE brightness paper is desired. EOP/Y is a bleaching sequence that a bleach solution of sodium hydroxide and hydrogen peroxide is mixed with the unbleached pulp first then the oxygen is injected into the slurry. After one or two hours in the bleaching tower, the slurry is washed and then mixed with the sodium hydrosulfite and pumped into another bleach tower and retained for an hour. The bleached pulp is then washed again to yield its highest brightness to be used in the paper machine.

If the unbleached groundwood content in the incoming pulp is higher than 20% (a delta a* value higher than 20) then the pulp will normally not be bleached and can be used for semi-bleached or unbleached stock known as brown stock.

A typical deinking system will usually have pulping, screening, washing, flotation, and bleaching. Pulping breaks the waste paper into fibers so that it can be cleaned of ink and debris. These other processes are used to remove ink and debris, and to bleach the fibers to remove dyes and obtain the desired brightness.

Another aspect of our invention is to control the bleaching of unbleached fibers to maintain the pulp fed to a deinking and bleaching process within the targeted range to achieve the predetermined brightness levels of the paper products.

In either application or in a combination of both applications, the primary advantage of our process is the speed with which the delta a*, delta b*, delta L* and delta brightness results can be obtained, usually in ten minutes or less, 5–7 minutes being the normal elapsed time from sampling to completing the characterization. The spectrophotometric and staining process of this invention is able to distinguish between modified and unmodified lignins. TAPPI Method T 236 om-99 lumps useful BCTMP lignins with unmodified lignins thus causing higher processing costs. In addition, the aforementioned TAPPI Method requires twenty minutes to be carried out while our process can be carried out in 5 to 10 minutes.

It should be noted that the BCTMP processes shift the spectral response into the invisible region making their use acceptable without additional bleaching to produce paper products having commercially acceptable brightness values.

In Table 2 the relationship between percent groundwood and delta a*, delta b*, delta L* brightness are set forth.

TABLE 2

Relationship Between Percent Groundwood and delta a*, b*, L* brightness

| % Grndwd | Kappa 1 | 2 | L* | a* | b* | Brightness | Delta L* | Delta a* | Delta b* | Delta Brightness |
|---|---|---|---|---|---|---|---|---|---|---|
| 0 | 0.4 | 0.4 | 94.82 | −0.44 | 6.24 | 79.25 | 1.23 | 0.48 | −2.08 | 5.52 |
| 0 | | 0.4 | 94.66 | −0.50 | 6.07 | 79.04 | 1.47 | 0.47 | −2.09 | 6.15 |
| 10 | 14.9 | 15.3 | 71.78 | 14.81 | −5.24 | 47.76 | 21.97 | 15.88 | 13.43 | 26.97 |
| 10 | 15.7 | 15.3 | 73.34 | 14.13 | −4.76 | 49.86 | 20.64 | 15.41 | 12.91 | 25.43 |
| 20 | 28.1 | 28.1 | 63.29 | 19.60 | −7.26 | 37.00 | 28.86 | 20.55 | 17.56 | 32.00 |
| 20 | | 28.1 | 64.06 | 19.40 | −7.35 | 38.13 | 28.23 | 20.47 | 17.62 | 31.19 |
| 30 | 42.2 | 42.2 | 59.39 | 22.03 | −8.73 | 33.02 | 31.36 | 22.53 | 19.12 | 33.09 |
| 30 | | 42.2 | 60.48 | 21.94 | −8.79 | 34.43 | 31.04 | 22.78 | 18.50 | 34.00 |
| 40 | 55.7 | 55.7 | 55.15 | 24.68 | −9.57 | 28.53 | 35.11 | 25.22 | 20.64 | 35.93 |
| 40 | | 55.7 | 56.68 | 24.13 | −9.84 | 30.50 | 34.05 | 24.86 | 20.34 | 35.50 |
| 50 | 69.6 | 70.15 | 52.44 | 26.43 | −10.17 | 25.94 | 36.84 | 26.82 | 22.11 | 35.73 |
| 50 | 70.7 | 70.15 | 54.37 | 26.21 | −10.48 | 28.29 | 35.21 | 26.78 | 22.25 | 34.14 |
| 60 | 84.2 | 84.2 | 50.05 | 28.10 | −10.56 | 23.72 | 38.69 | 28.49 | 22.86 | 36.59 |
| 60 | | 84.2 | 51.45 | 27.49 | −10.85 | 25.34 | 37.98 | 28.19 | 22.73 | 36.71 |
| 70 | 103.9 | 103.9 | 48.29 | 29.25 | −10.91 | 22.18 | 40.07 | 29.59 | 23.32 | 37.34 |
| 70 | | 103.9 | 48.93 | 29.36 | −11.07 | 22.90 | 39.29 | 29.83 | 23.63 | 36.24 |
| 80 | 124 | 124 | 46.48 | 30.72 | −10.95 | 20.50 | 41.01 | 30.98 | 23.52 | 37.29 |
| 80 | | 124 | 47.40 | 30.30 | −11.39 | 21.60 | 40.42 | 30.74 | 24.06 | 36.70 |
| 90 | 137 | 137 | 44.33 | 31.88 | −11.18 | 18.74 | 43.53 | 32.74 | 23.68 | 39.80 |
| 90 | | 137 | 45.17 | 31.66 | −11.58 | 19.66 | 42.89 | 32.50 | 24.14 | 39.20 |
| 100 | 150.2 | 153.05 | 41.45 | 33.61 | −11.20 | 16.35 | 40.03 | 34.15 | 25.12 | 38.39 |
| 100 | 155.9 | 153.05 | 42.86 | 32.96 | −11.69 | 17.74 | 44.77 | 33.92 | 26.22 | 38.38 |

The TAPPI Method T 236 om-99 measures only gross lignin content and thus under predicts brightness attainable with the pulp stream containing modified lignins. Thus, if the aforementioned TAPPI Method of determining lignin content is used to control the amount of the higher grade waste papers added to the waste paper stream, more expensive higher grades will be used than is necessary to achieve the targeted brightness of the paper products. Our process avoids this costly waste, as the amount of high grade waste paper required to reach the targeted brightness is predicted more accurately; so the bias toward mixing in too much high grade waste paper can be substantially reduced.

A very important aspect of our invention is that it enables a more precise control of finished stock brightness. Our process predicts the finished product more accurately and therefore will usually result in less variation of the finished stock brightness and higher usage of the groundwood containing waste paper to meet the same target brightness. This results in greater savings and also facilitates the use of waste paper which may not have been previously used to produce paper products having GE brightness values of 60 to 85.

There is thus provided a method of making cellulosic pulp finished stock of a selected brightness utilizing groundwood containing secondary pulp comprising: (a) determining a phloroglucinol color delta for the secondary pulp; (b) selecting a finished pulp brightness suitable for the secondary pulp of step (a) based on the phloroglucinol color delta of the pulp determined in step (a); (c) optionally blending the secondary pulp with a supplemental cellulosic pulp; (d) optionally de-inking the groundwood containing secondary pulp and supplemental pulp; and (e) bleaching the groundwood containing secondary pulp of step (a) and optionally bleaching the supplemental pulp blended in step (d) to achieve a finished stock having the selected brightness. In some cases the finished pulp brightness is a GE brightness of at least about 60, a GE brightness from about 60 to about 85. The process is particularly useful when the secondary pulp comprises bleached groundwood such as BCTMP and APMP.

The secondary pulp may include from about 5 to about 20 weight percent BCTMP based on the dry pulp weight and the phloroglucinol color delta is selected from delta L*, delta a*, delta b* and delta brightness. When the phloroglucinol color delta is delta L*, delta L* typically has a value of from about 0 to about 28. When the phloroglucinol color delta is delta b*, the delta b* typically has a value of from about −2 to about 17. When the phloroglucinol color delta is delta brightness, the delta brightness typically has a value of from about 5 to about 31. When the phloroglucinol color delta is delta a*, the delta a* typically has a value of from about 0 to about 20.

In another aspect of the invention there is provided a method of making cellulosic pulp finished stock of a selected brightness utilizing groundwood containing secondary pulp comprising: (a) selecting a finished stock brightness; (b)selecting a secondary fiber bleaching protocol; (c) determining a phloroglucinol color delta for the secondary pulp; (d) blending the secondary pulp characterized in step (c) with a supplemental cellulosic pulp based on the phloroglucinol color delta of the pulp to produce a blended pulp including groundwood; (e) optionally de-inking the groundwood containing blended pulp; and (f) bleaching the groundwood containing blended pulp following the selected secondary fiber bleaching practice of step (b) to achieve a finished stock having the selected brightness of step (a). Typically, the finished stock has a GE brightness of from about 70–80 and the blended pulp has a groundwood content of from about 10 percent to about 20 percent or a groundwood content of from about 15 percent to about 20 percent. The blended pulp may have an unbleached groundwood content of from about 8 percent to about 18 percent, or from about 12 percent to about 15 percent. The process may further include maintaining a reservoir of the blended pulp having a groundwood content within a predetermined range, such as the reservoir of blended pulp is maintained with a groundwood content of between about 10 weight percent and about 20 weight percent, or where the reservoir of blended pulp is maintained with a groundwood content of between about 15 weight percent and about 20 weight percent. The reservoir of blended pulp may be maintained with an unmodified groundwood content of from about 8 percent to about 18 percent.

In still yet another aspect of the invention there is provided a method of making cellulosic pulp finished stock of a selected brightness utilizing groundwood containing secondary pulp comprising: (a) selecting a finished stock brightness; (b) determining a phloroglucinol color delta for the secondary pulp; (c) selecting a bleaching protocol for the secondary pulp based on the phloroglucinol color delta of the pulp determined in step (b); (d) optionally de-inking the groundwood containing secondary pulp; and (e) bleaching the secondary pulp following the protocol selected in step (c) to produce the finished stock having the brightness selected in step (a).

The invention is likewise useful for allocating groundwood containing pulps to a brown stock or semi-bleached products as noted hereinafter.

In a still further aspect of the invention there is provided a method of allocating groundwood containing cellulosic pulp among a plurality of reservoirs thereof comprising: (a) determining a phloroglucinol color delta of the groundwood containing pulp; and (b) allocating the groundwood containing pulp characterized in step (a) among the plurality of reservoirs based on the phloroglucinol color delta. The pulp may be allocated so as to equalize the phoroglucinol color delta of the pulp contained in the reservoirs about a common target phloroglucinol color delta value which may correspond to a groundwood content of from about 15 percent to about 20 percent.

In still yet other aspects of the invention, the phloroglucinol color deltas of groundwood containing pulps in general are utilized as enumerated herein and exemplified in connection with secondary pulps.

These and other aspects of the invention will be appreciated from the discussion which follows.

DESCRIPTION OF THE INVENTION

Figure 1:
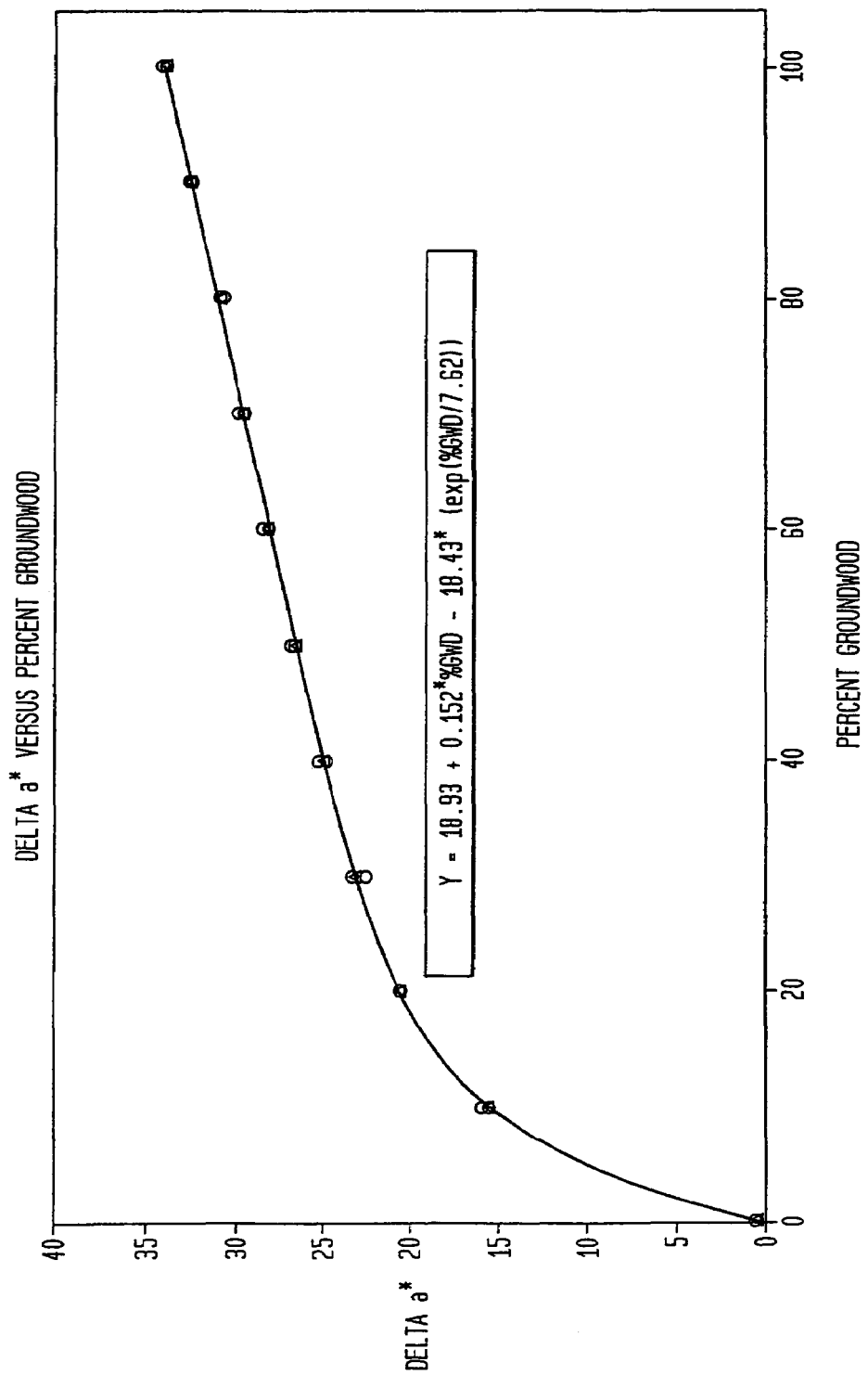
FIG. 1 is a graph illustrating the relationship between delta a* values and percent groundwood.
Figure 2:
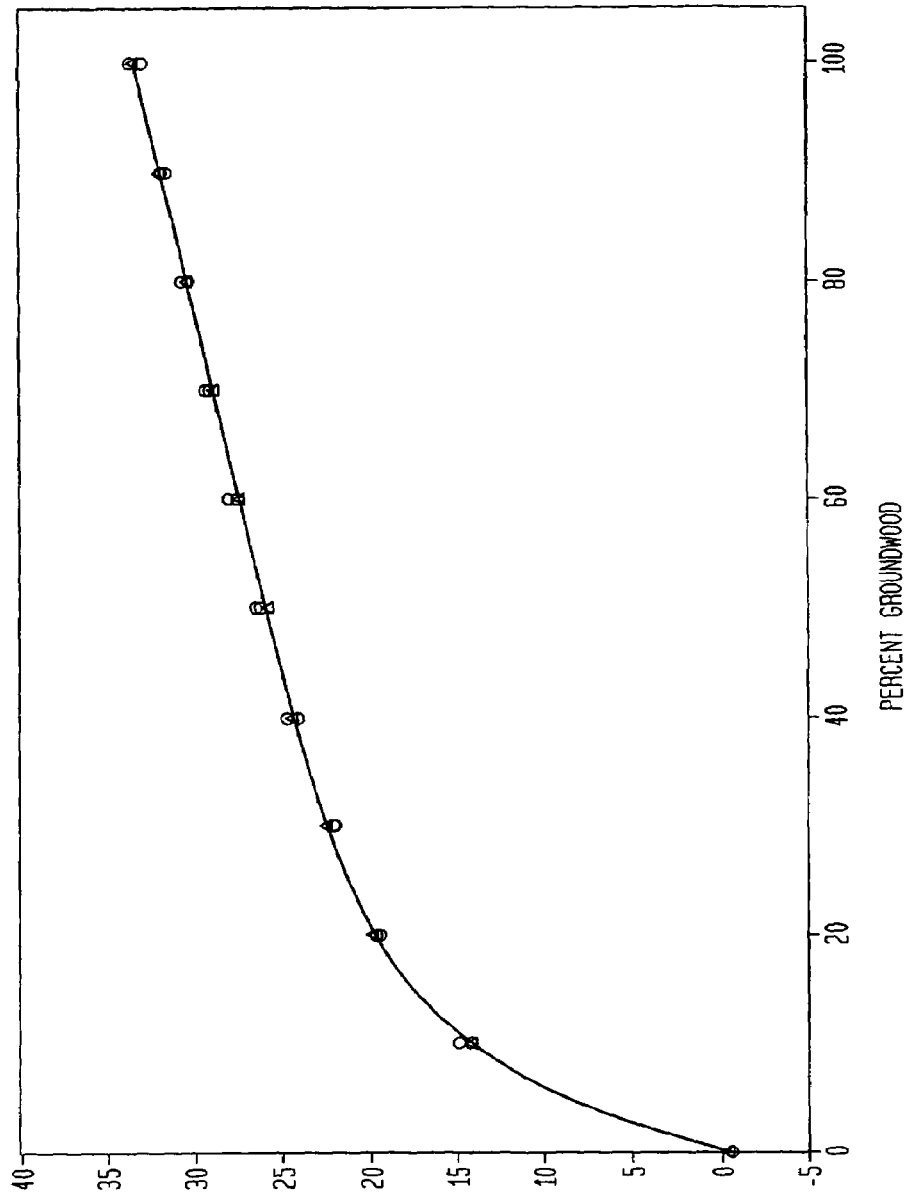
FIG. 2 is a graph illustrating the relationship between a* and percent groundwood.

In recent years, the cost of waste paper has escalated. There is limited availability for good quality waste paper. The present invention answers a long felt need for utilizing waste paper having high lignin or groundwood content. It also was determined that TAPPI Method T 236 om-99 fails to recognize that modified lignins such as those created by the BCTMP processes do not need the rigorous deinking and bleaching regiments required of waste paper pulp having high groundwood content. The TAPPI Method also takes about 20 minutes for determining the amount of groundwood in waste paper pulp while in our process this is done in less than 10 minutes, usually 5 to 7 minutes. The claimed process overcomes all these disadvantages of the prior art groundwood determination methods and provides a fast and reliable method for determining the amount of chemically untreated groundwood fiber present in the pulp being charged to the deinking and bleaching system.

We have discovered a process for the manufacture of absorbent paper sheets from pulp derived from waste paper. This process comprises preparing a pulp from recycle furnish to form secondary fiber and preparing an absorbent sheet from said secondary papermaking fiber, characterizing the initial color of said absorbent sheet with a phloroglucinol stain and characterizing the color of said absorbent sheet. The process depends on comparing the color of the stained sheet with the initial color and selecting a target paper product based on the comparison. Suitably the characterization comprises a parameter selected consisting of lightness parameter, a red green parameter and a yellow blue parameter.

Suitably, CIE L*, a*, b* and brightness values are used to determine the percent groundwood in the feedstock. This is done by obtaining the delta L*, delta a*, delta b* and brightness values.

It should be noted that L*, a*, and b* values may be suitably measured using test methods such as TAPPI T 524 om-02, TAPPI T 527 om-02, or similar methods. TAPPI T 524 incorporates 45° directional illumination and perpendicular (0°) observation geometry. TAPPI T 527 incorporates diffuse illumination and 0° observation geometry. The Gretag-Macbeth spectrophotometer used in our invention incorporates diffuse illumination and 8° observation geometry.

L* is a measure of lightness increasing from 0 for black to 100 for perfect white; a* indicates redness when positive and green when negative; b* indicates yellowness when positive and blueness when negative.

The Kappa number is defined as follows in TAPPI Method T 236 om-99 P as follows: the Kappa number is the volume (in millimeters) of 0.1N potassium permanganate solution consumed by one gram of moisture-free pulp the results are corrected to 50% consumption of the permanganate added.

Suitable groundwood fibers include thermomechanical pulp (TMP), chemithermo-mechanical pulp (CTMP) as well as bleached chemithermo-mechanical pulps (BCTMP). Alkaline peroxide mechanical pulps, sometimes referred to "APMP" or simply "AMP" may likewise be utilized in accordance with the present invention. Lignin-rich pulps generally have a lignin content of more than 5% based on the weight of the pulp; typically more than 10 percent and suitably about 20 percent or more lignin content by weight.

A phloroglucinol color delta of a pulp refers to a color difference between an absorbent sheet made with the pulp stained with phloroglucinol stain and a like absorbent sheet made from the same pulp which has not been stained. This quantity is thus a property of the pulp from which the absorbent sheet is made. The phloroglucinol color delta of a pulp may be the difference in L*, a*, b* or brightness as described hereinafter. In these instances, the phloroglucinol color delta of the pulp is simply referred to as delta L*, delta a*, delta b* or delta brightness of the pulp, respectively.

Figure 3:
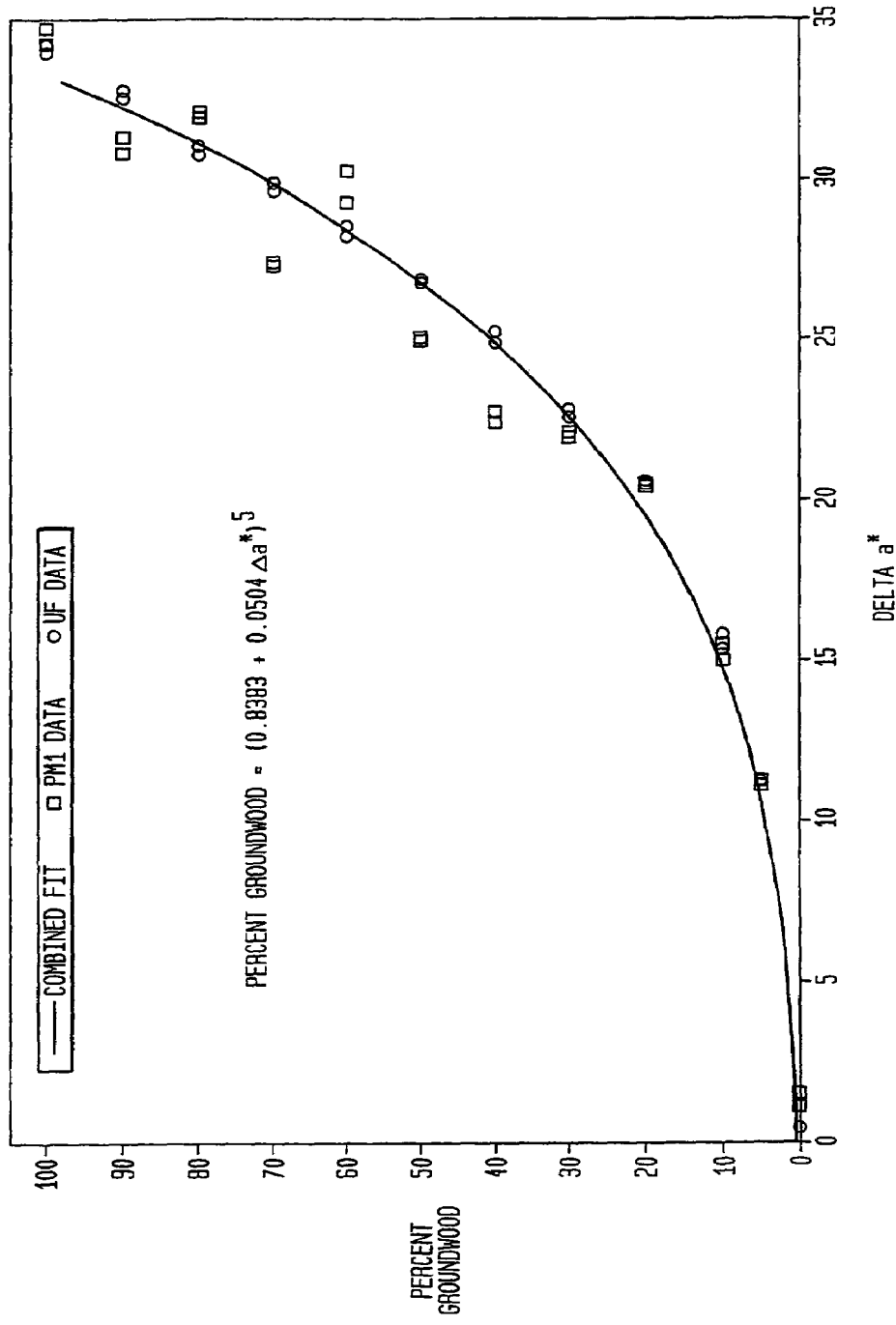
FIG. 3 is a graph illustrating the relationship between the estimated percent groundwood and delta a*.
Figure 5:
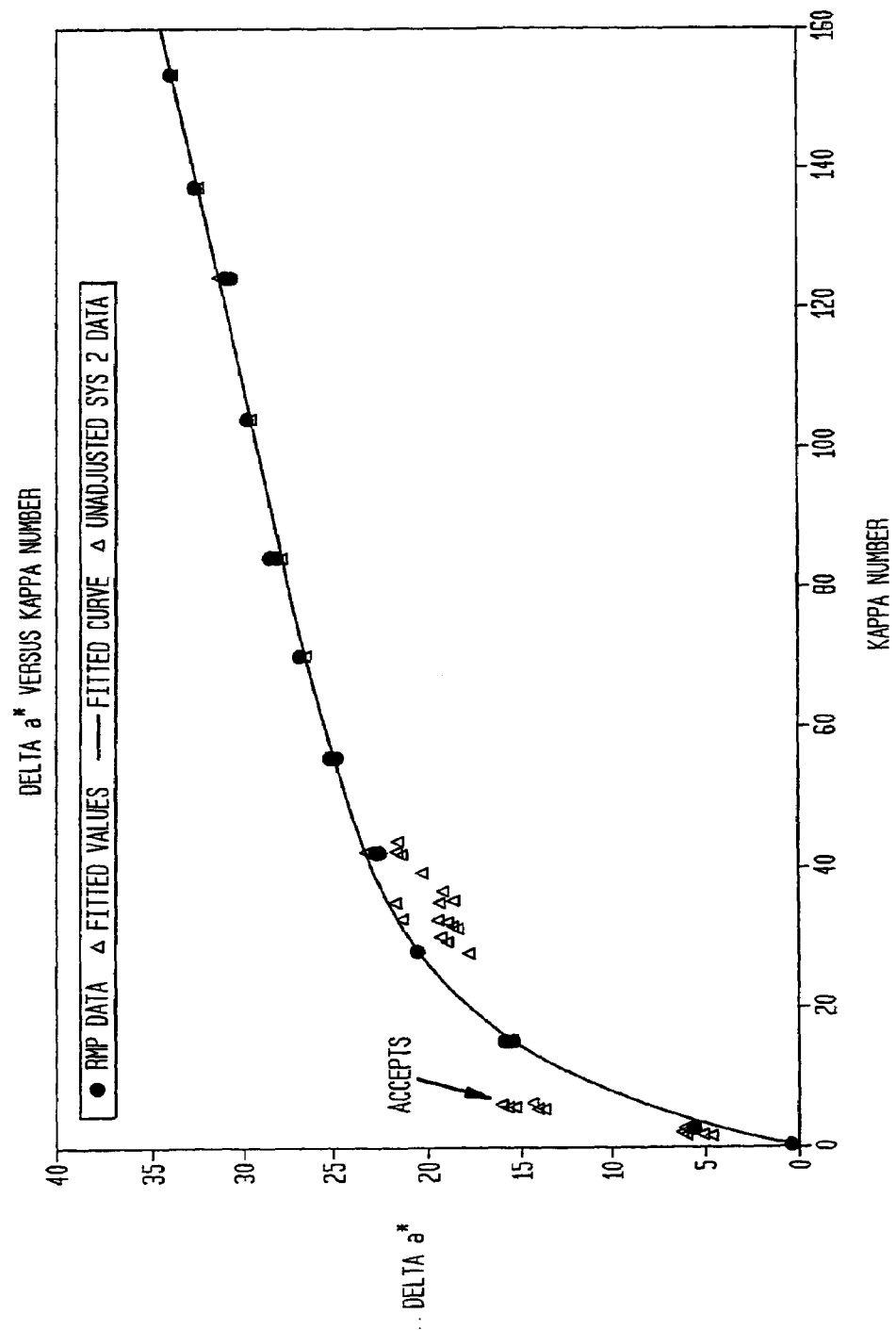
FIG. 5 is a graph illustrating the relationship between delta a* and Kappa numbers obtained using TAPPI Method T 236 om-99.
Figure 6:
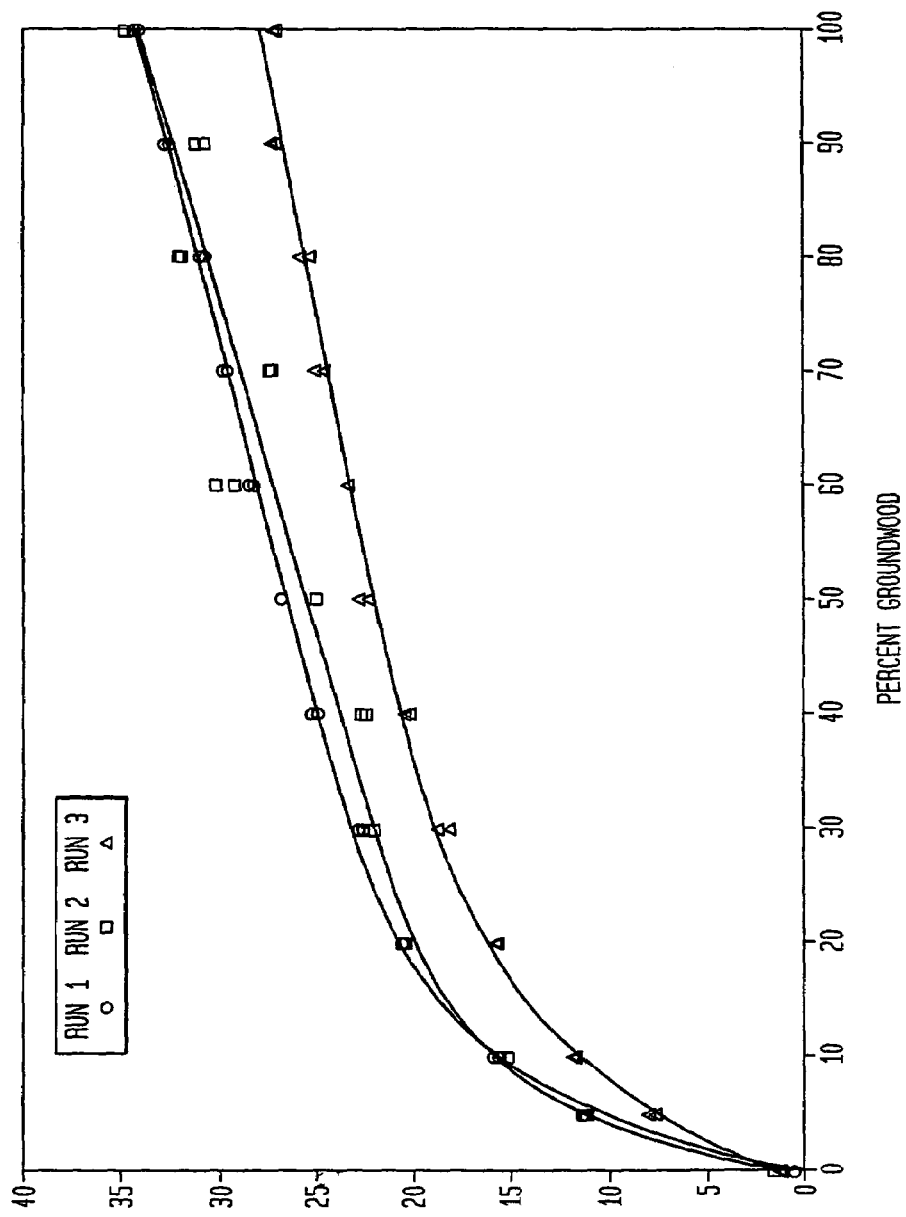
FIG. 6 is a graph illustrating the relationship between delta a* and percent total groundwood for three different kinds of groundwood.
Figure 25:
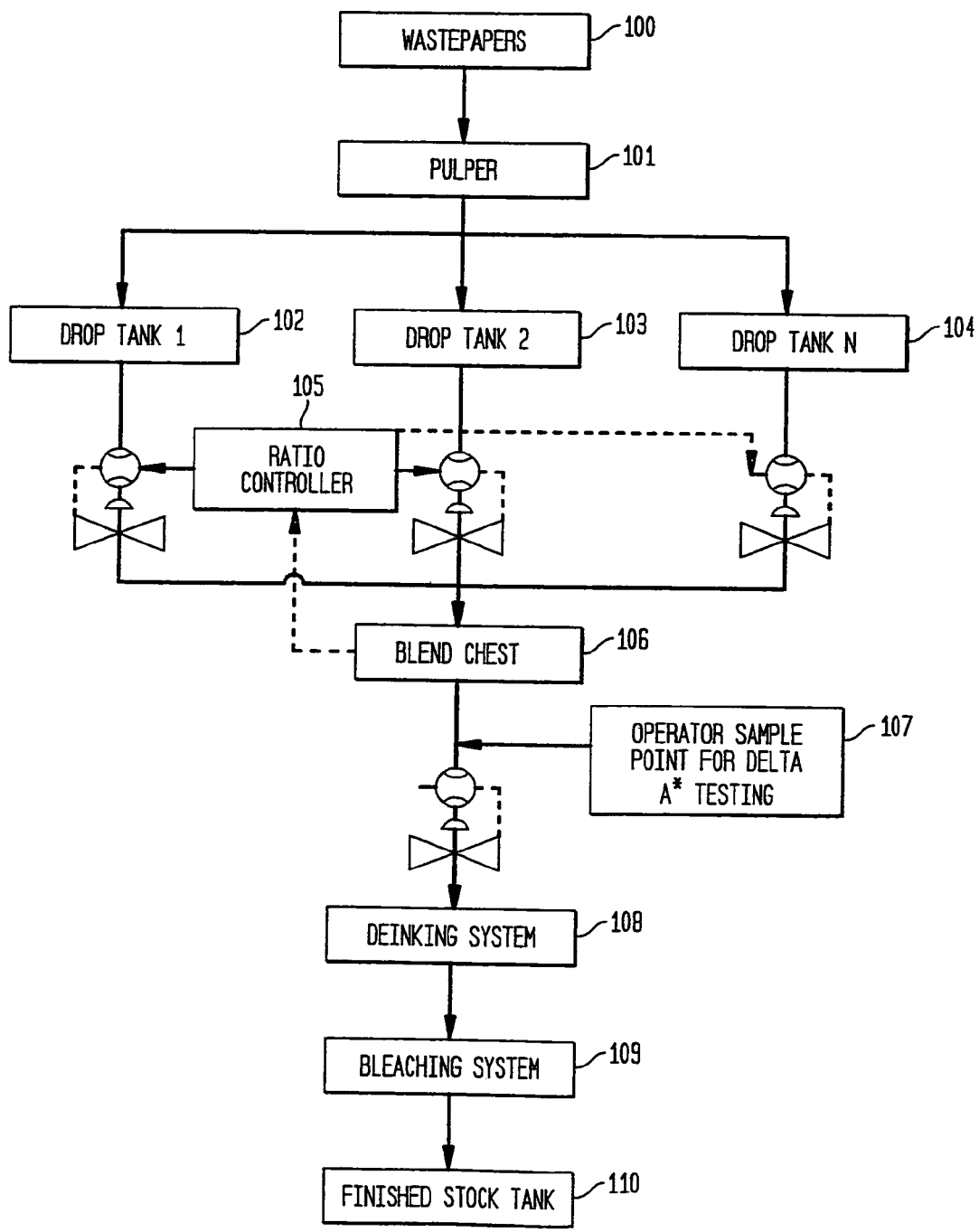
FIG. 25 is a graph illustrating the relationship between delta a* and the Kappa number.
Figure 25:
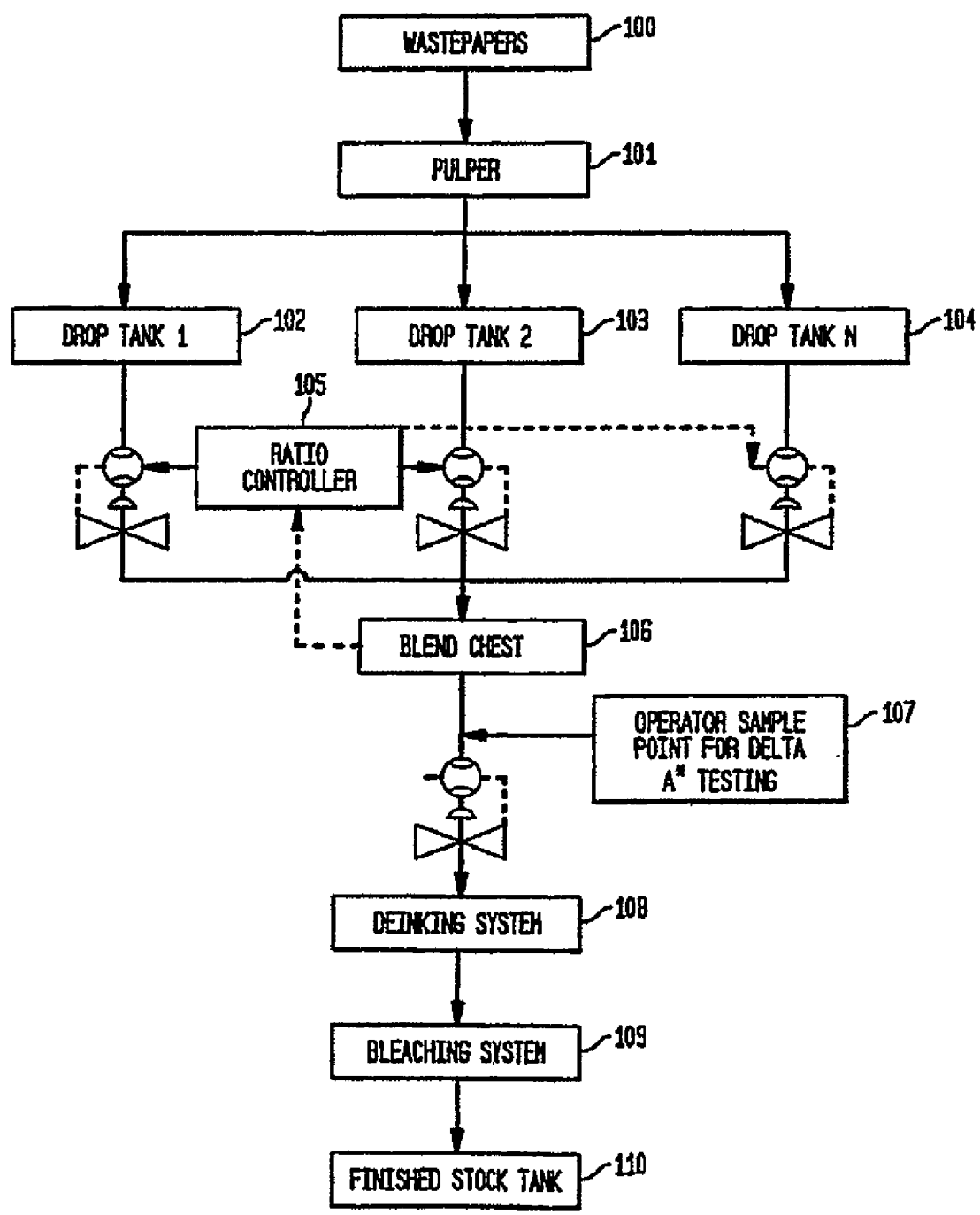

The delta a* values versus percent groundwood are illustrated in FIG. 1 for two types of groundwood; note also FIG. 3. The relationship between delta a* and Kappa number is shown in FIG. 5 for refiner mechanical pulp. The invention is perhaps better understood by reference to FIGS. 6 and 25. It is seen in FIG. 6 that at a given percent groundwood level, pulp containing treated mechanical pulp (BCTMP) exhibits much lower delta a* values than pulp containing like amounts of untreated groundwood (RMP). Likewise, it is seen in FIG. 25 that at a given Kappa number (TAPPI Method T 236 om-99) that pulps containing BCTMP exhibit lower delta a* values than pulps with corresponding Kappa numbers containing RMP, for example.

Figure 12:
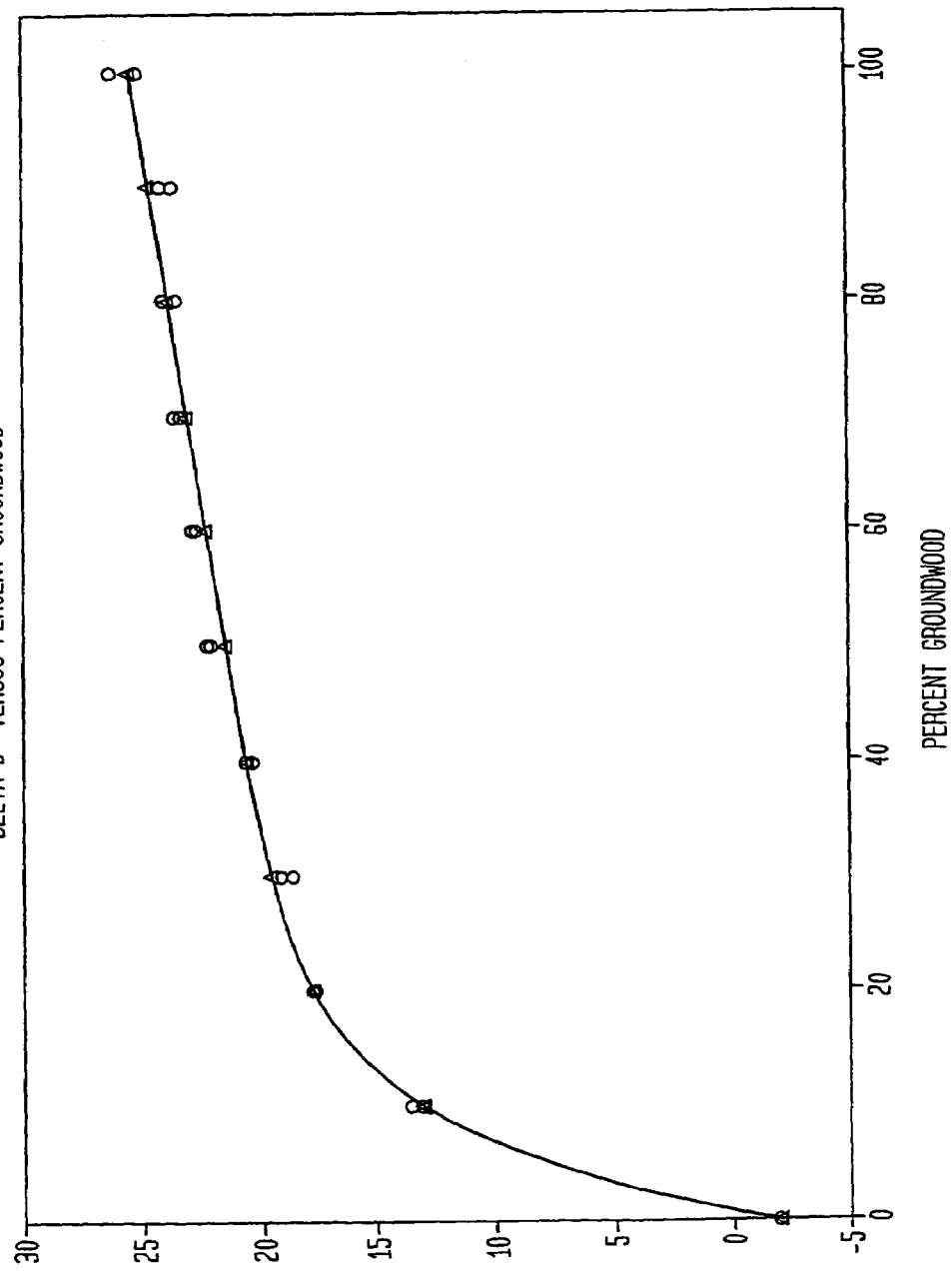
FIG. 12 is a graph illustrating delta b* versus percent groundwood.
Figure 13:
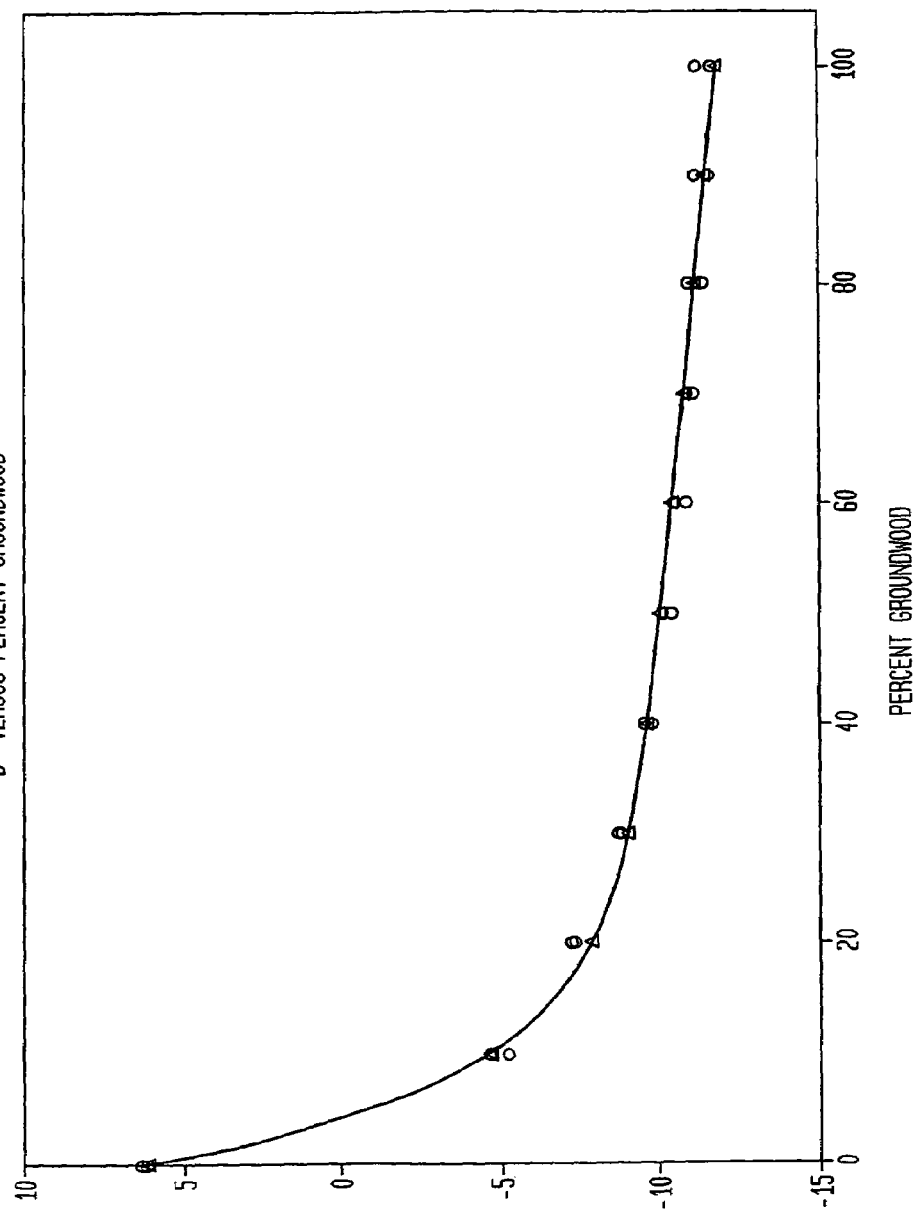
FIG. 13 is a graph illustrating b* versus percent groundwood.
Figure 14:
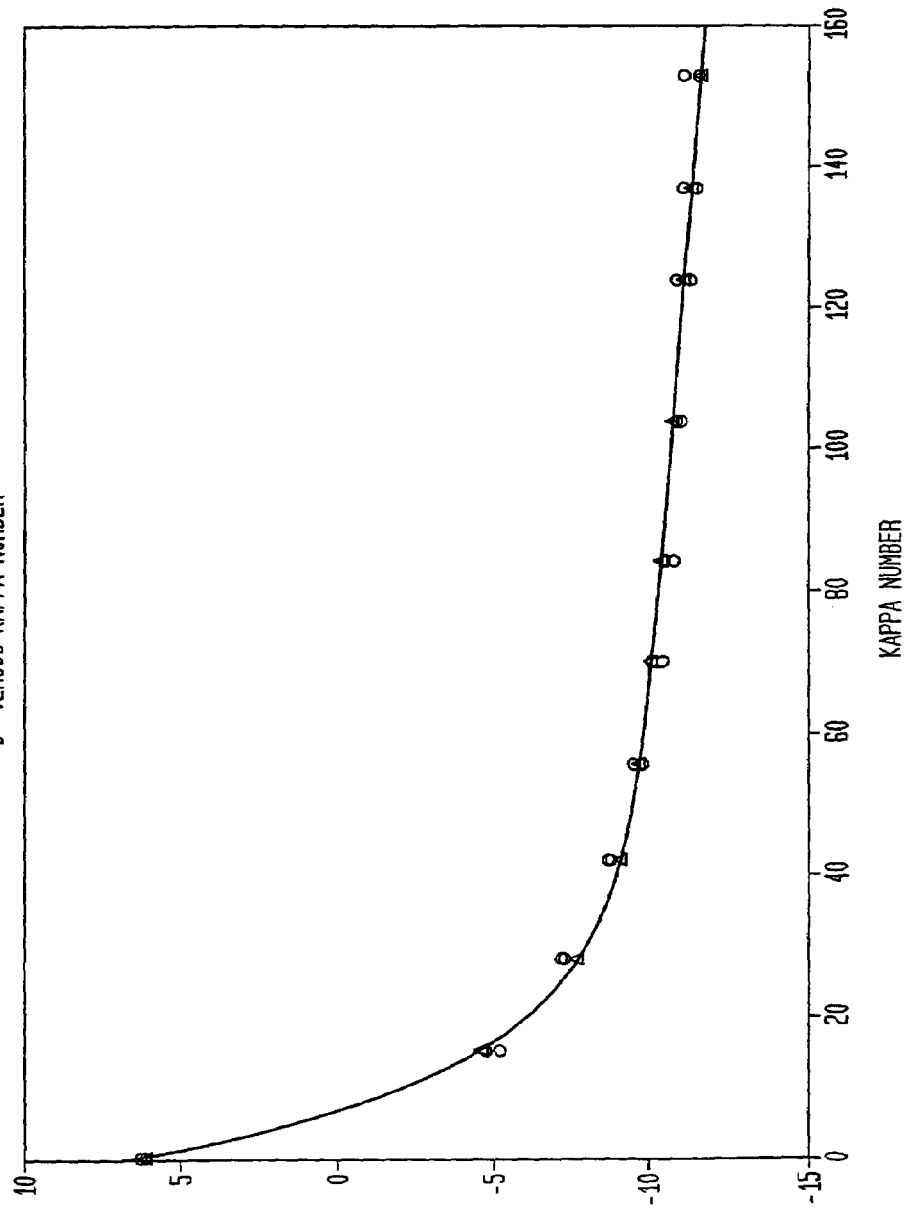
FIG. 14 is a graph illustrating the relationship between b* and Kappa numbers obtained by using TAPPI Method T 236 om-99.

The delta b* values versus percent groundwood are illustrated in FIG. 12. Fiber exhibiting a delta b* value in the range of about −2 to 17 may be advantageously processed to obtain GE brightness values in the finished pulp of about 60 to 85.

Figure 15:
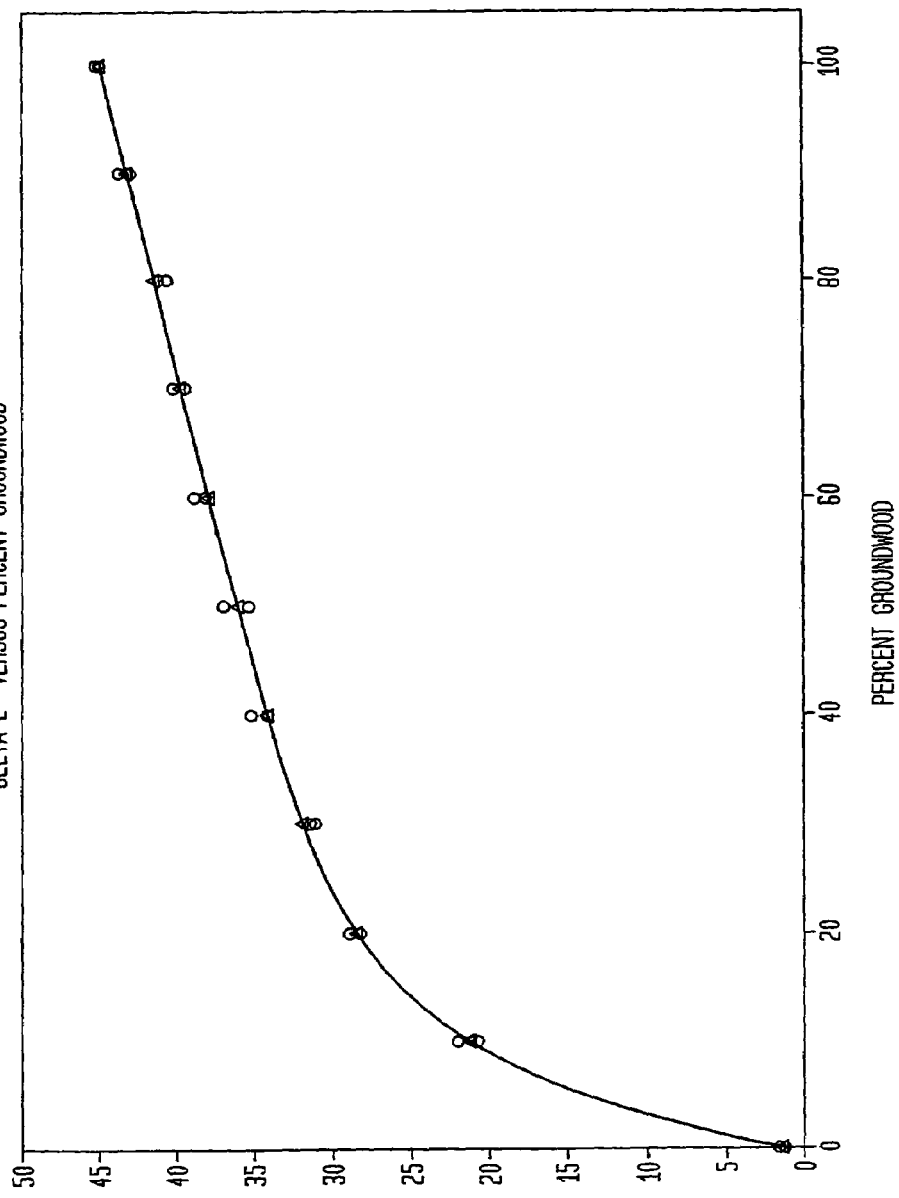
FIG. 15 is a graph which illustrates the relationship between delta L* and percent groundwood.
Figure 16:
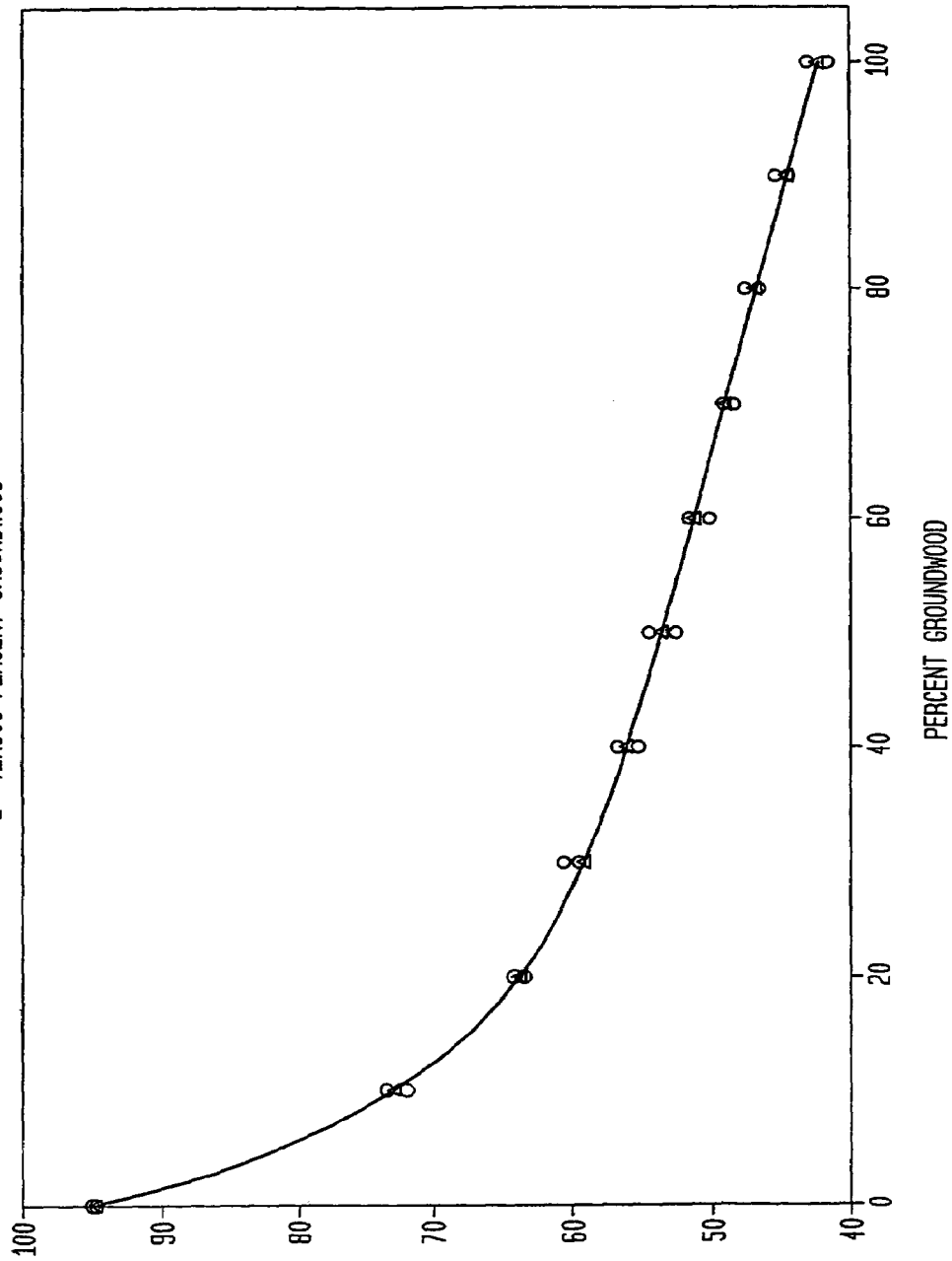
FIG. 16 is a graph illustrating L* versus percent groundwood.
Figure 17:
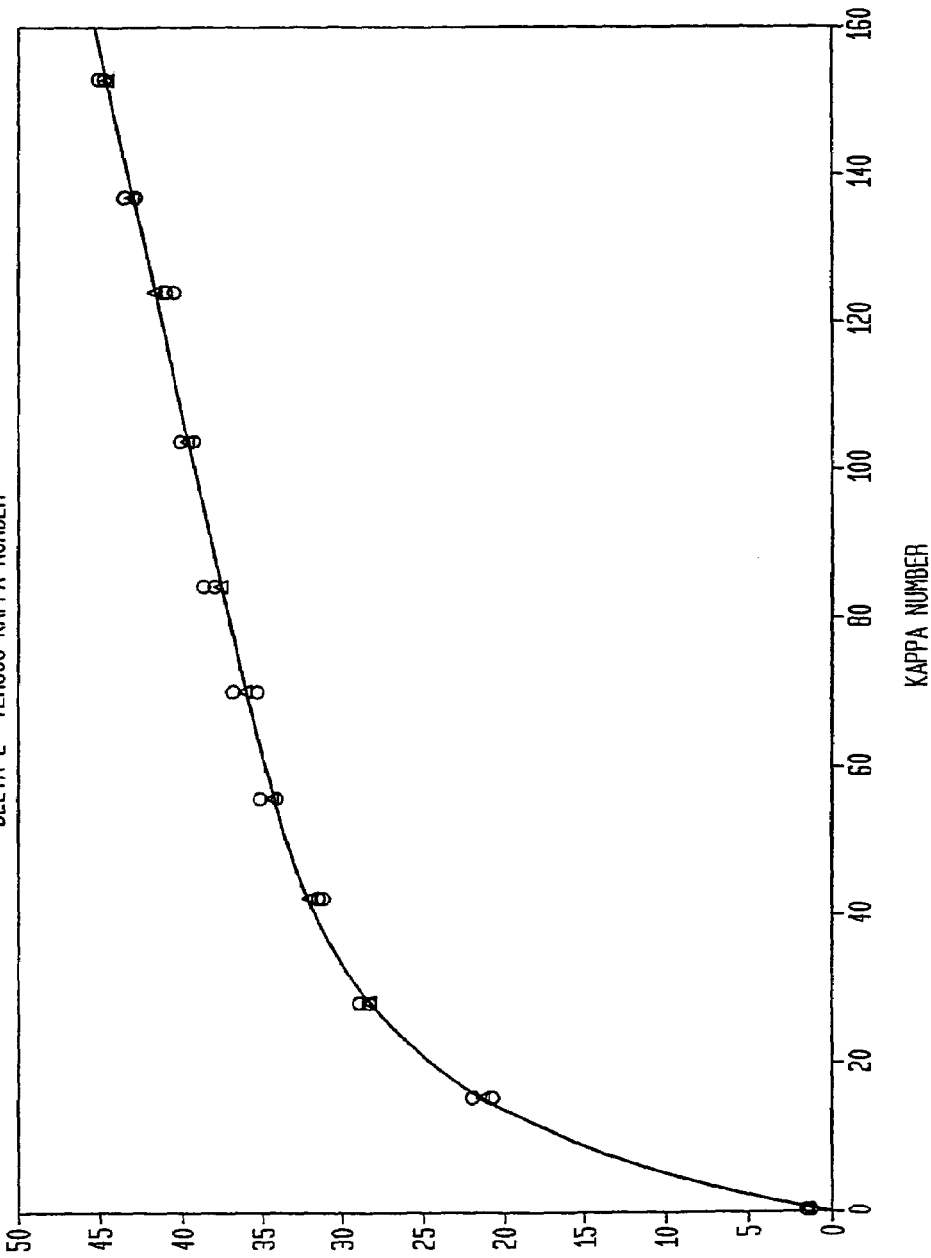
FIG. 17 is a graph illustrating the relationship between delta L* and Kappa numbers obtained by using TAPPI Method T 236 om-99.
Figure 18:
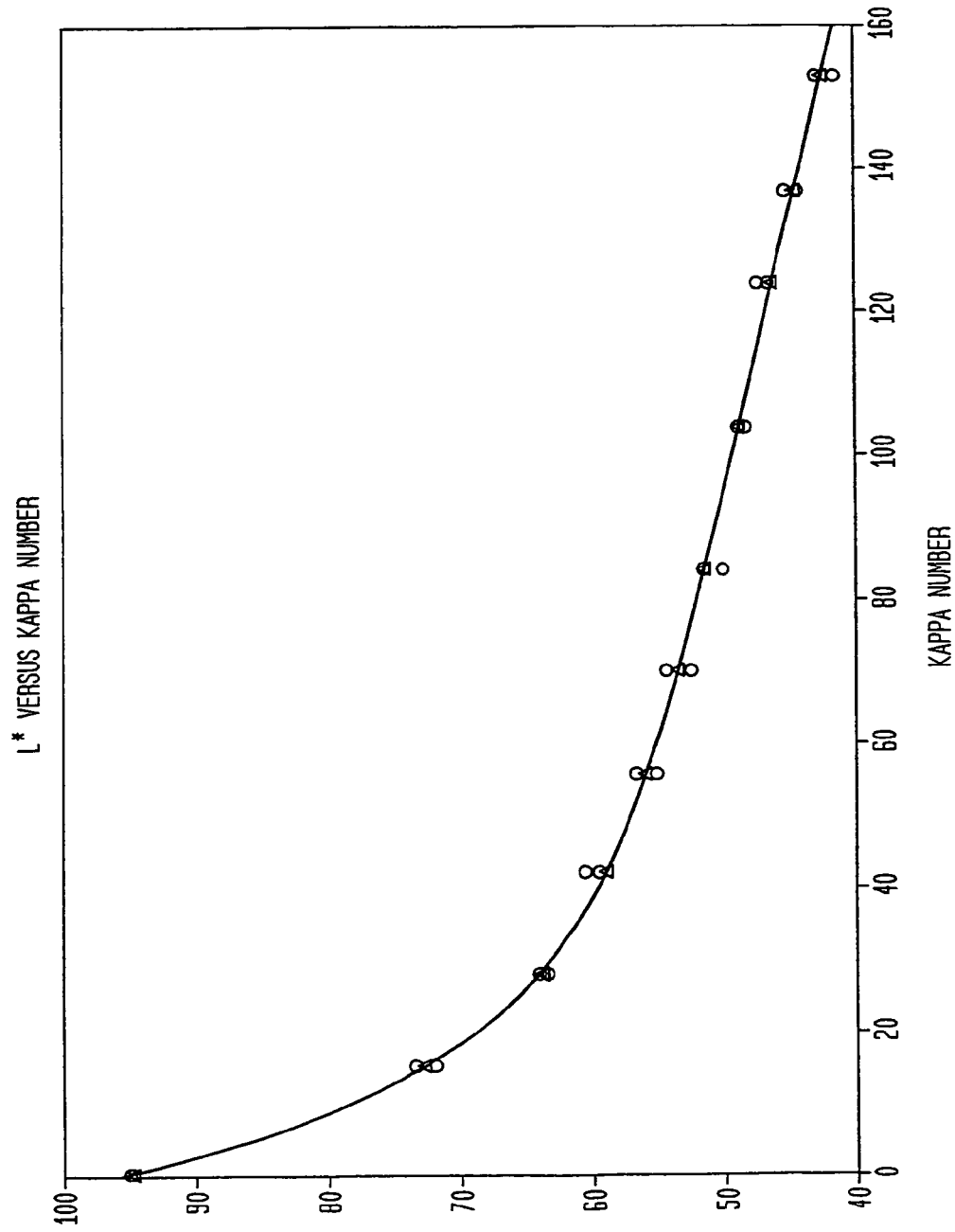
FIG. 18 is a graph illustrating the relationship between L* and Kappa number obtained by using TAPPI Method T 236 om-99.

The delta L* values versus percent groundwood are illustrated in FIG. 15. Fiber exhibiting a delta L* values in the range of from about 0 to 28 may be processed to obtain GE brightness values in the finished pulp of about 60 to 85 as well.

Figure 19:
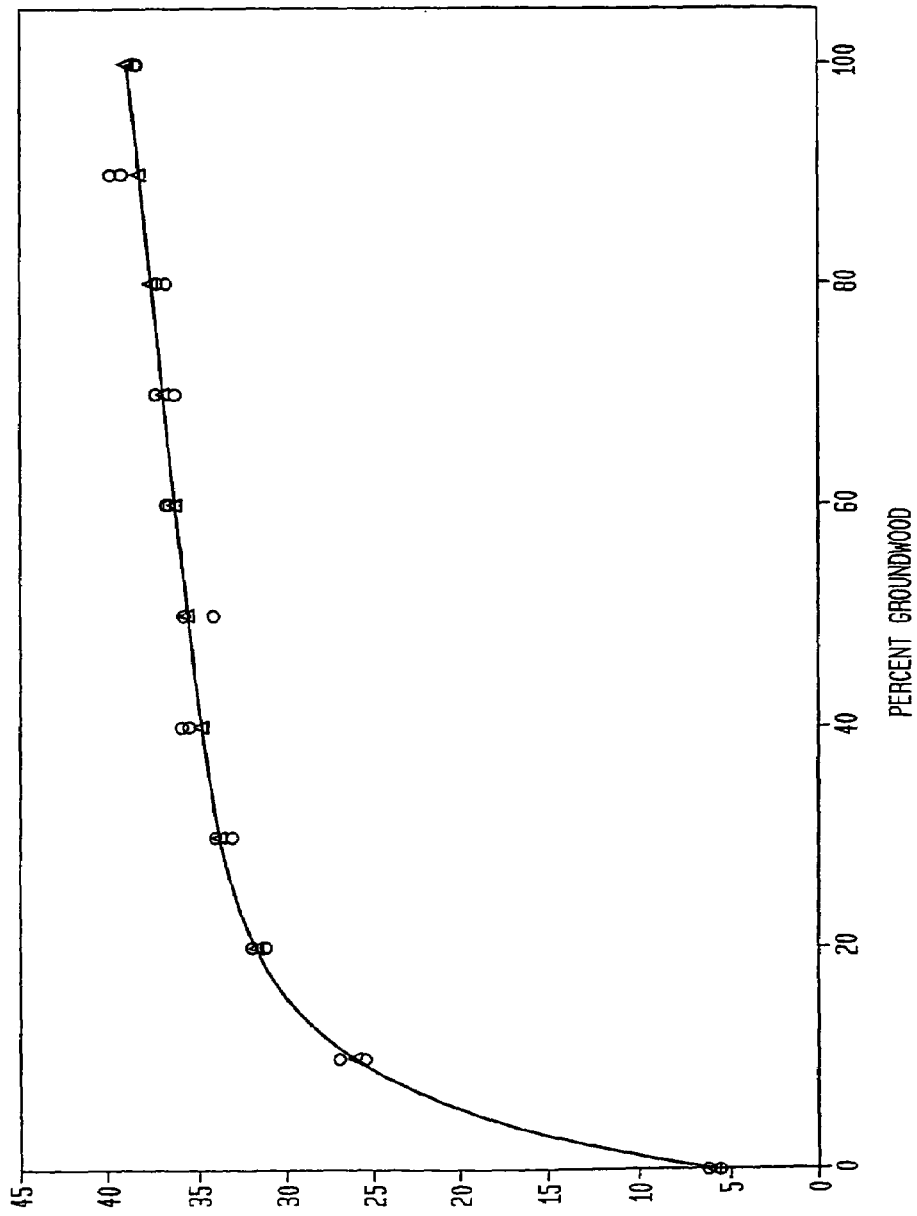
FIG. 19 is a graph illustrating delta brightness and percent groundwood.
Figure 20:
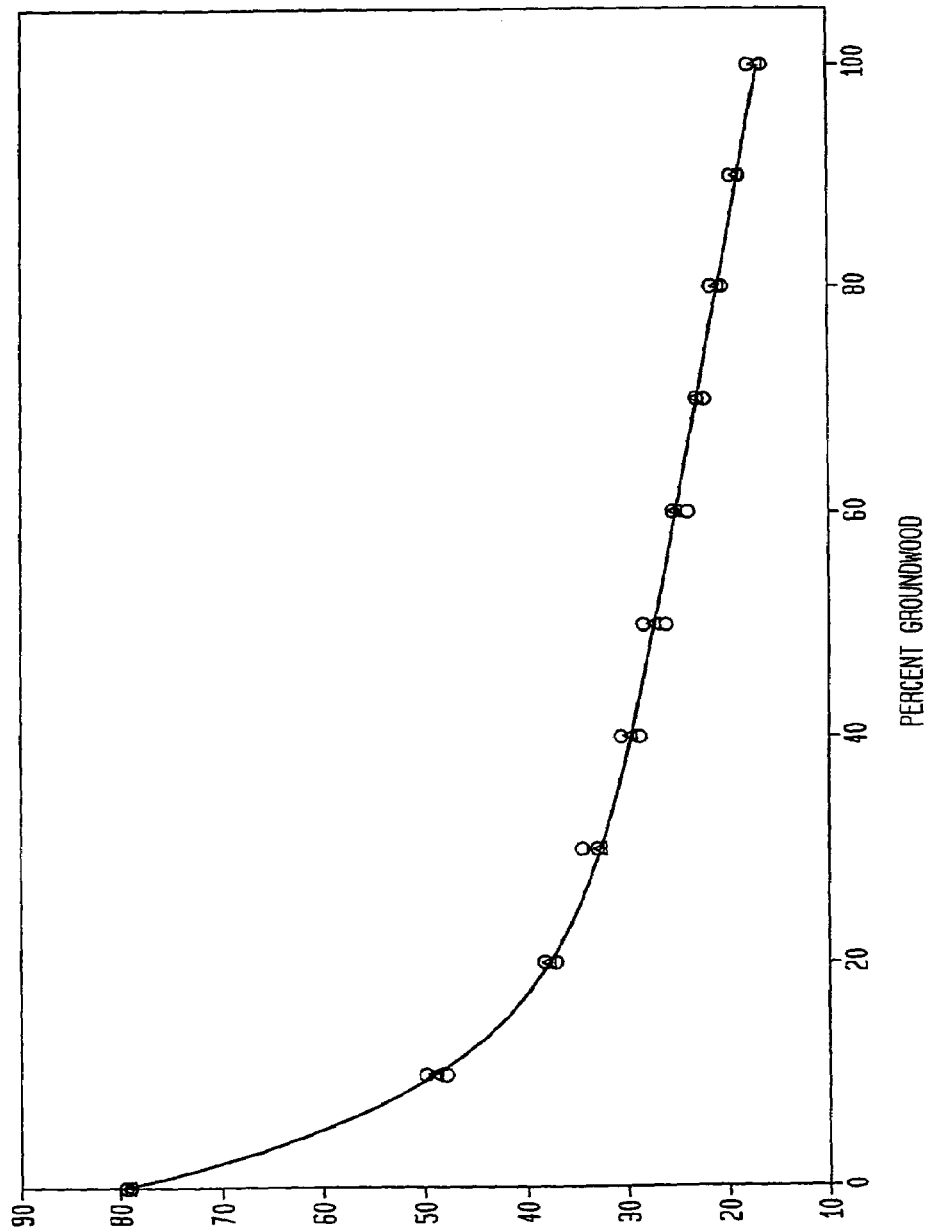
FIG. 20 is a graph illustrating brightness and percent groundwood.
Figure 21:
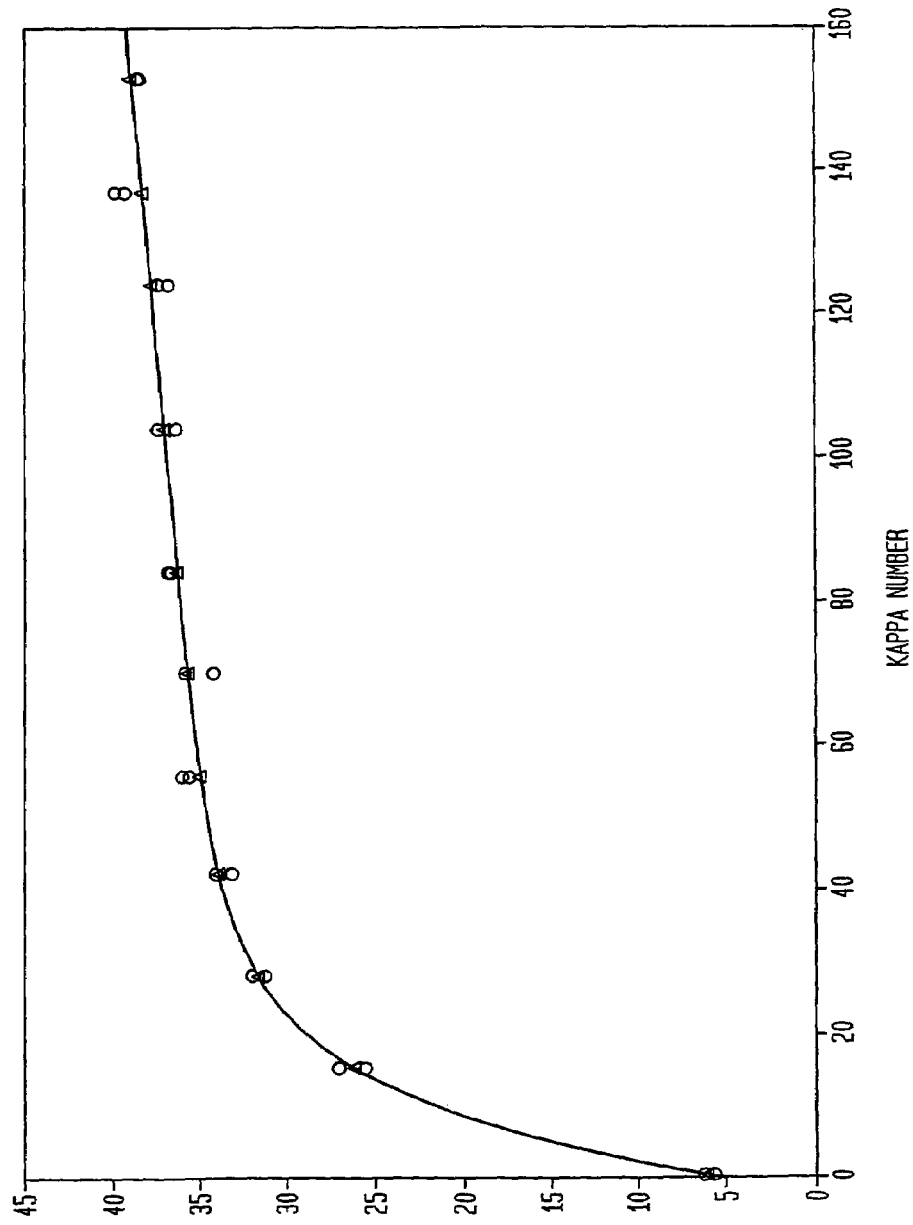
FIG. 21 is a graph illustrating the relationship between delta brightness and Kappa numbers obtained by using TAPPI Method T 236 om-99.
Figure 22:
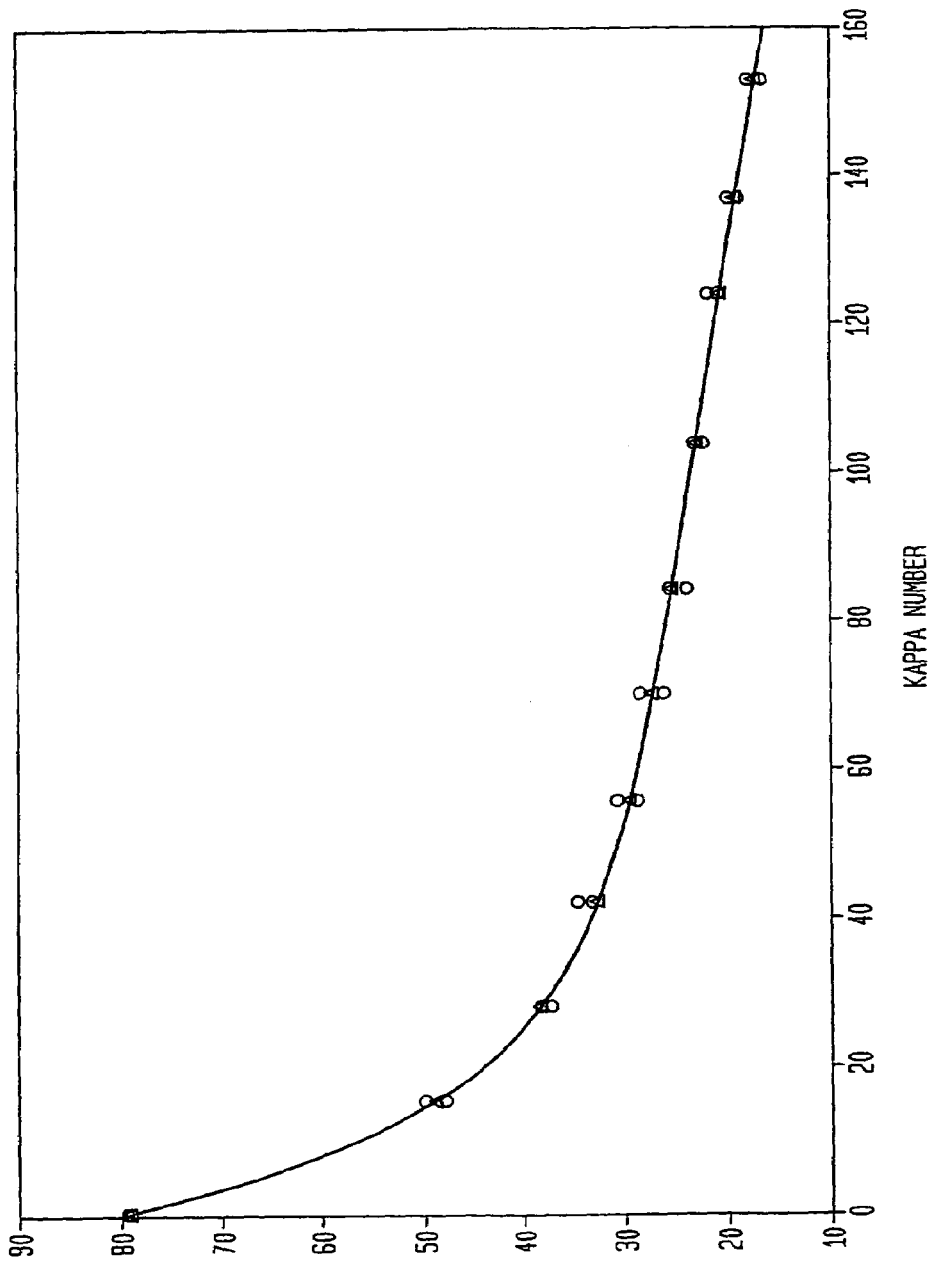
FIG. 22 is a graph illustrating the relationship between brightness and Kappa numbers obtained by using TAPPI Method T 236 om-99.
Figure 23:
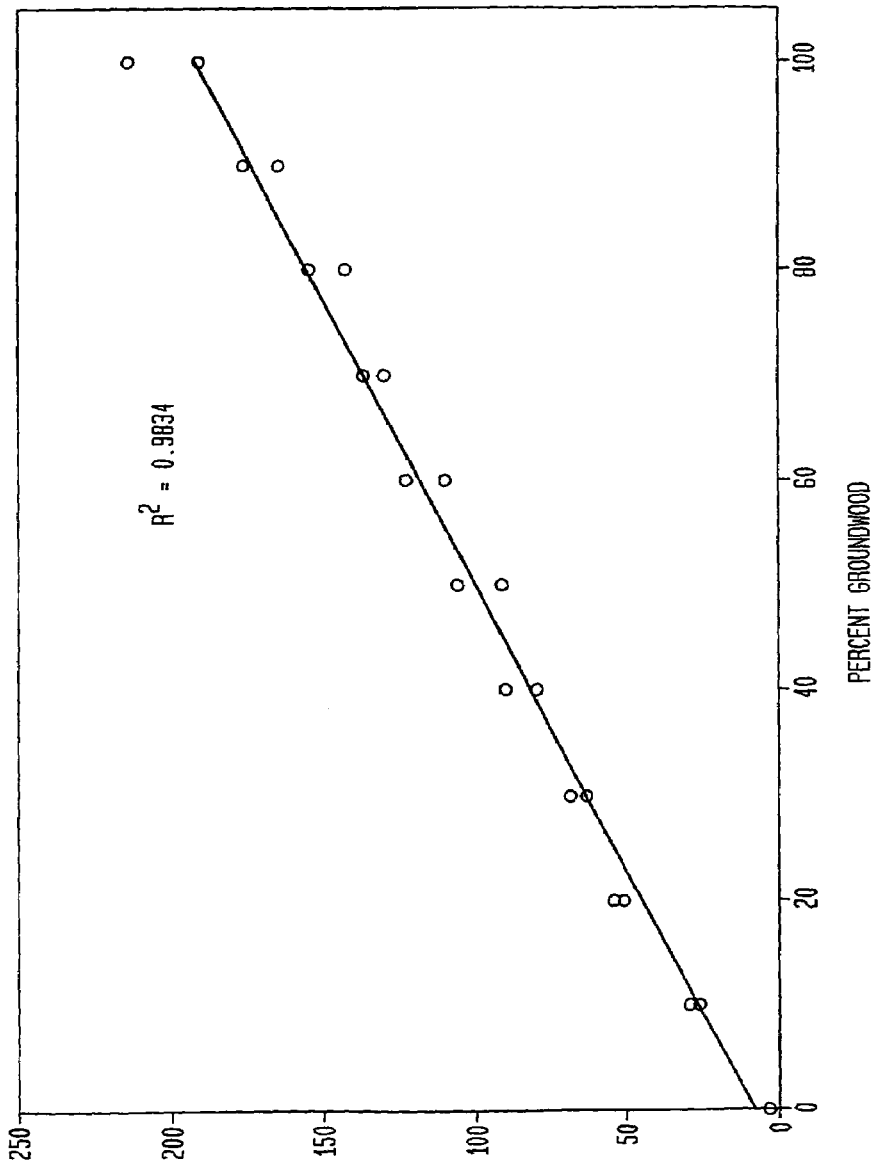
FIG. 23 is a graph illustrating transformed brightness versus percent groundwood.
Figure 24:
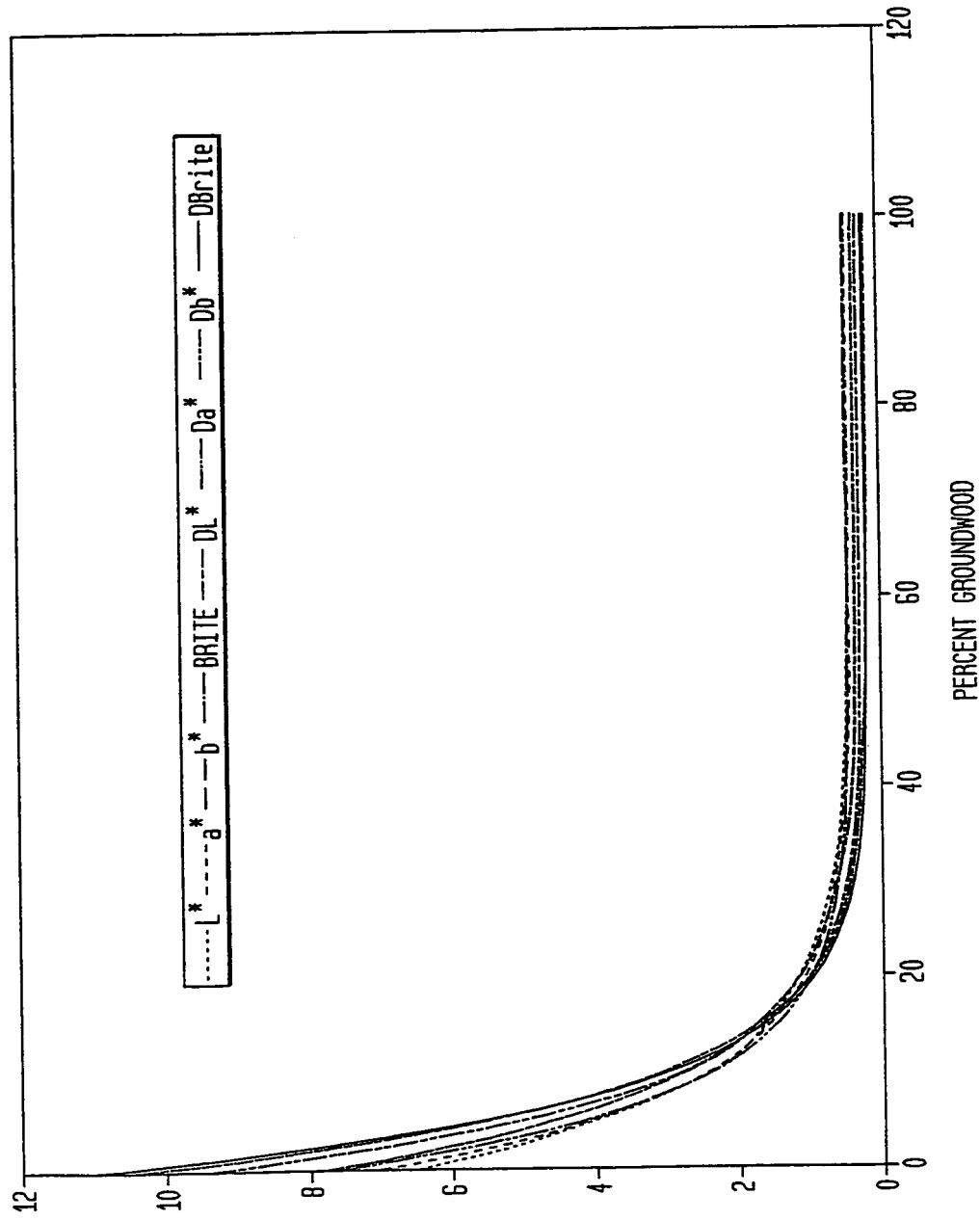
FIG. 24 is a graph illustrating normalized derivatives of L*, a*, b*, brightness, delta L*, delta a*, delta b* and delta brightness*.

The delta brightness values versus percent groundwood are illustrated in FIG. 19. Fiber exhibiting a delta brightness value of from about 5 to 31 is suitably processed to obtain GE brightness values in the paper product of about 60 to 85.

Note that GE brightness is measured in accordance with TAPPI T 452 om-02. TAPPI 452 incorporates 45° illumination and 0° observation geometry. This differs from the brightness measured with the Gretag-Macbeth spectrophotometer that is used to determine percent groundwood. The Gretag-Macbeth spectrophotometer incorporates diffuse illumination and 8° observation geometry. Unless specifically designated as GE brightness, brightness refers to brightness measured by the Gretag-Macbeth spectrophotometer.

Figure 4:
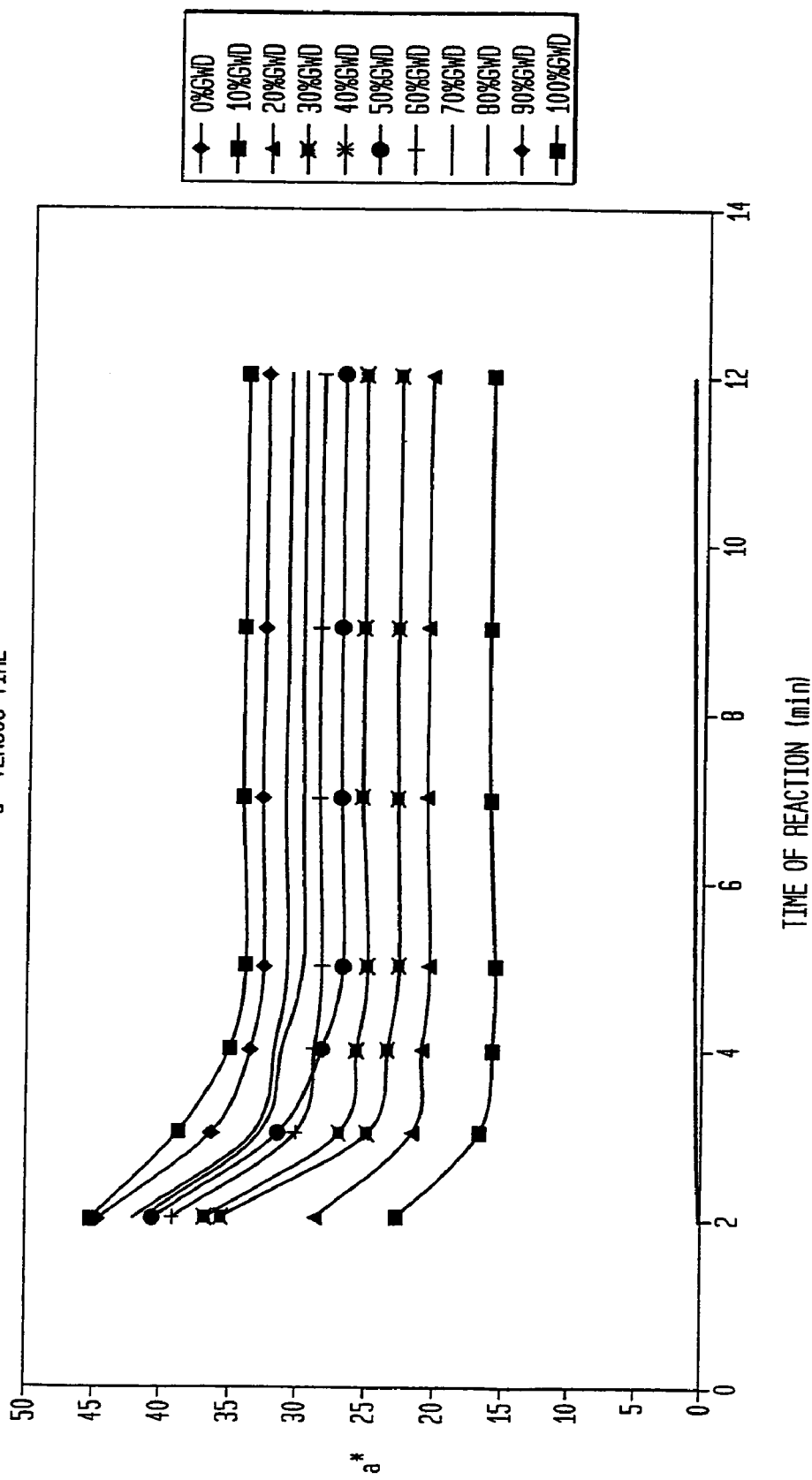
FIG. 4 is a graph illustrating the relationship between a* and reaction time. This graph demonstrates that a* value for handsheets can be obtained within five minutes after the handsheet is treated with phloroglucinol.

Our invention provides a rapid process for determining chemically untreated groundwood in pulp derived from waste paper prior to it being charged to the deinking/bleaching system. In our process, handsheets are made from the pulp undergoing evaluation are stained with phloroglucinol stain. The stain solution consists of 8.0 grams phloroglucinol, dihydrate, 100 ml ethyl alcohol and 20 ml concentrated hydrochloric acid. A Gretag-Macbeth Color Eye 3100 spectro-photometer is used to measure the color value of the stained handsheet sample and to compare it to an unstained handsheet sample. The Gretag-Macbeth spectrophotometer is set up to provide CIE L*, a* and b* measurements. We have discovered that chemically untreated groundwood content correlates very closely to the change or delta in the a*, L* and b* values obtained using the spectrophotometer before and after staining with phloroglucinol. In FIG. 4 the graph shows the relationship between a* and reaction time. From FIG. 4 it can be determined that reliable delta a* values can be obtained within five minutes after staining with phloroglucinol.

FIGS. 1 and 3 illustrate the relationship between percent chemically untreated groundwood and delta a*. Those values are very important to the paper manufacturer since if the delta a* value is less than 10 then conventional delignifying bleaching processes such as hypochlorite processes may be used to produce 60 to 85 GE brightness paper products. If the unbleached groundwood content incoming pulps is in the medium range as indicated by an average delta a* of 10 to 20, then a non-delignifying bleaching technique, such as peroxide and/or hydrosulfite bleaching processes may be used to produce the 60 to 85 GE brightness paper products. If the unbleached groundwood content in the incoming pulp is in the high range as indicated by a delta a* value of greater than about 20, then the pulp can be used for semi-bleached or unbleached stock generally known as brown stock. This same relationship holds for specific delta b*, delta L* and delta brightness values. By utilizing the phloroglucinol staining process and spectrophotometer analysis of the treated and untreated handsheets we obtain delta a*, delta b*, delta L* and delta brightness values which give us control on what deinking/bleaching process to utilize. This, of course, depends on the amount of chemically untreated groundwood in the incoming pulp. Alternatively, we can use this same information to blend pulps to maximize the amount of groundwood utilized to achieve a paper product having commercially acceptable brightness properties. 60 to 85 GE brightness pulps are used to produce absorbent paper products such as tissues.

Figure 7:
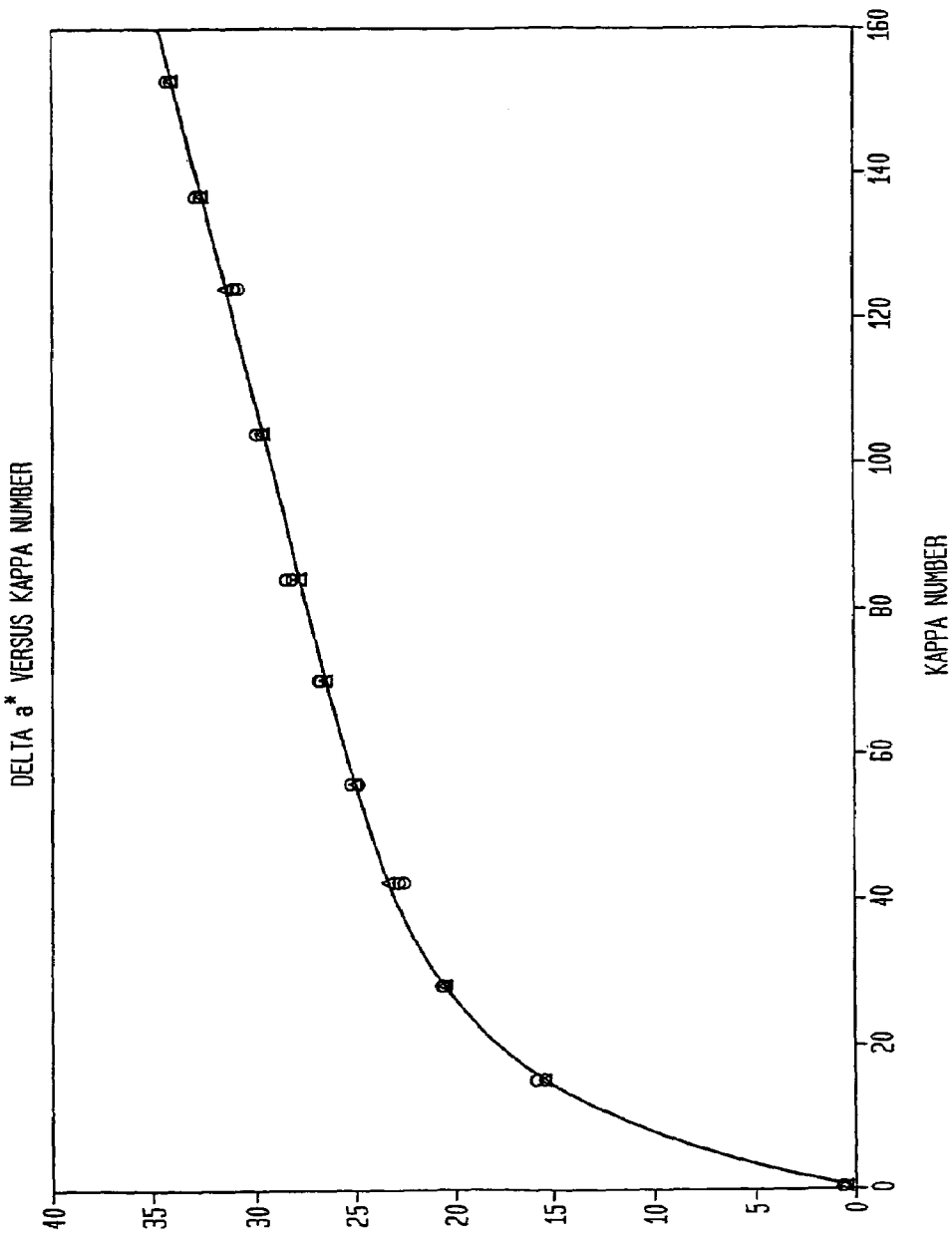
FIG. 7 is a graph illustrating the relationship between delta a* and Kappa number. It should be noted that TAPPI Method T 236 om-99 includes in Kappa numbers BCTMP treated groundwood fibers while the delta a* excludes these fibers and other fibers which have been chemically treated.
Figure 8:
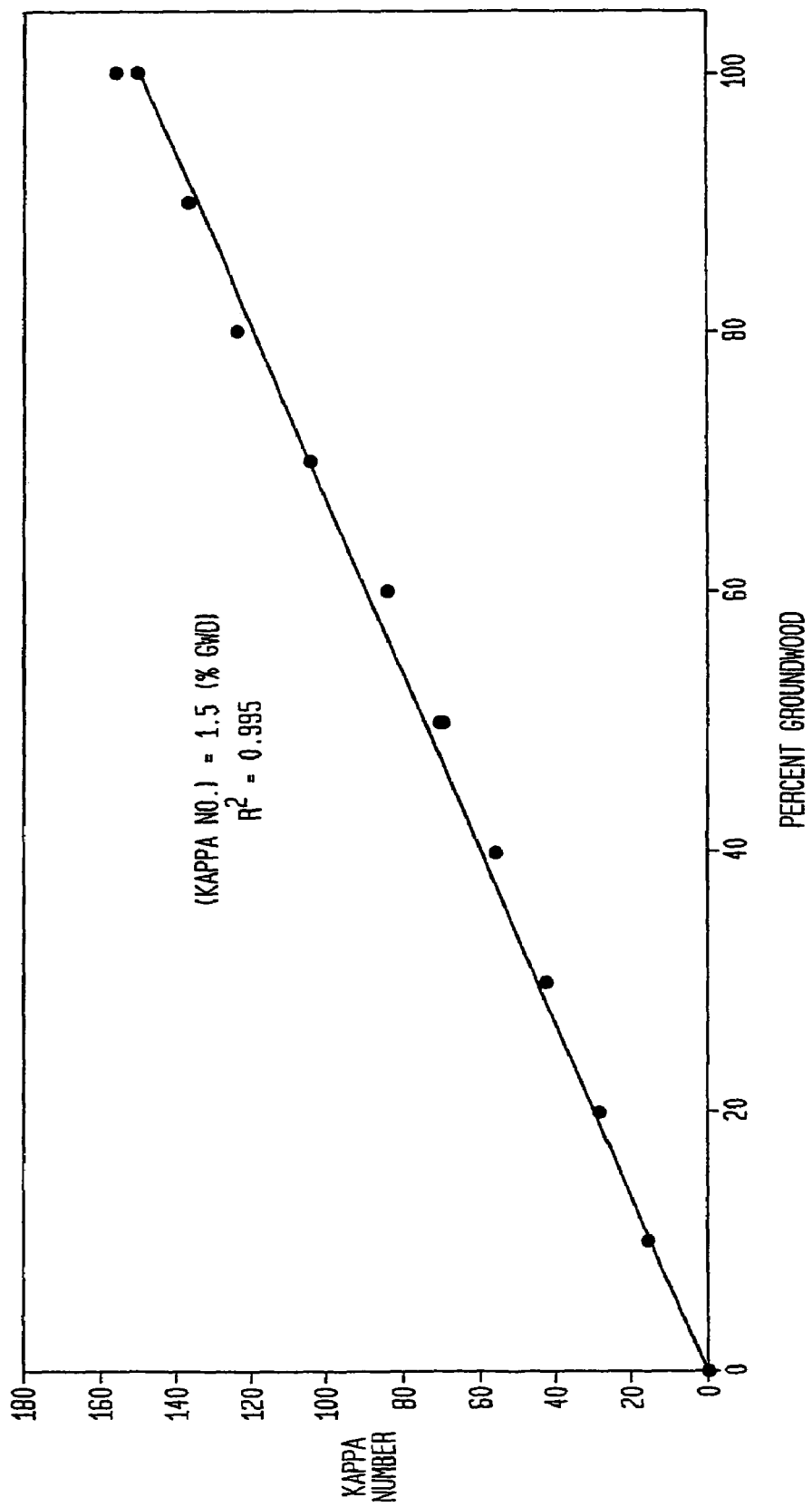
FIGS. 8 and 9 are graphs showing the relationship between the Kappa number and percent of total groundwood.
Figure 9:
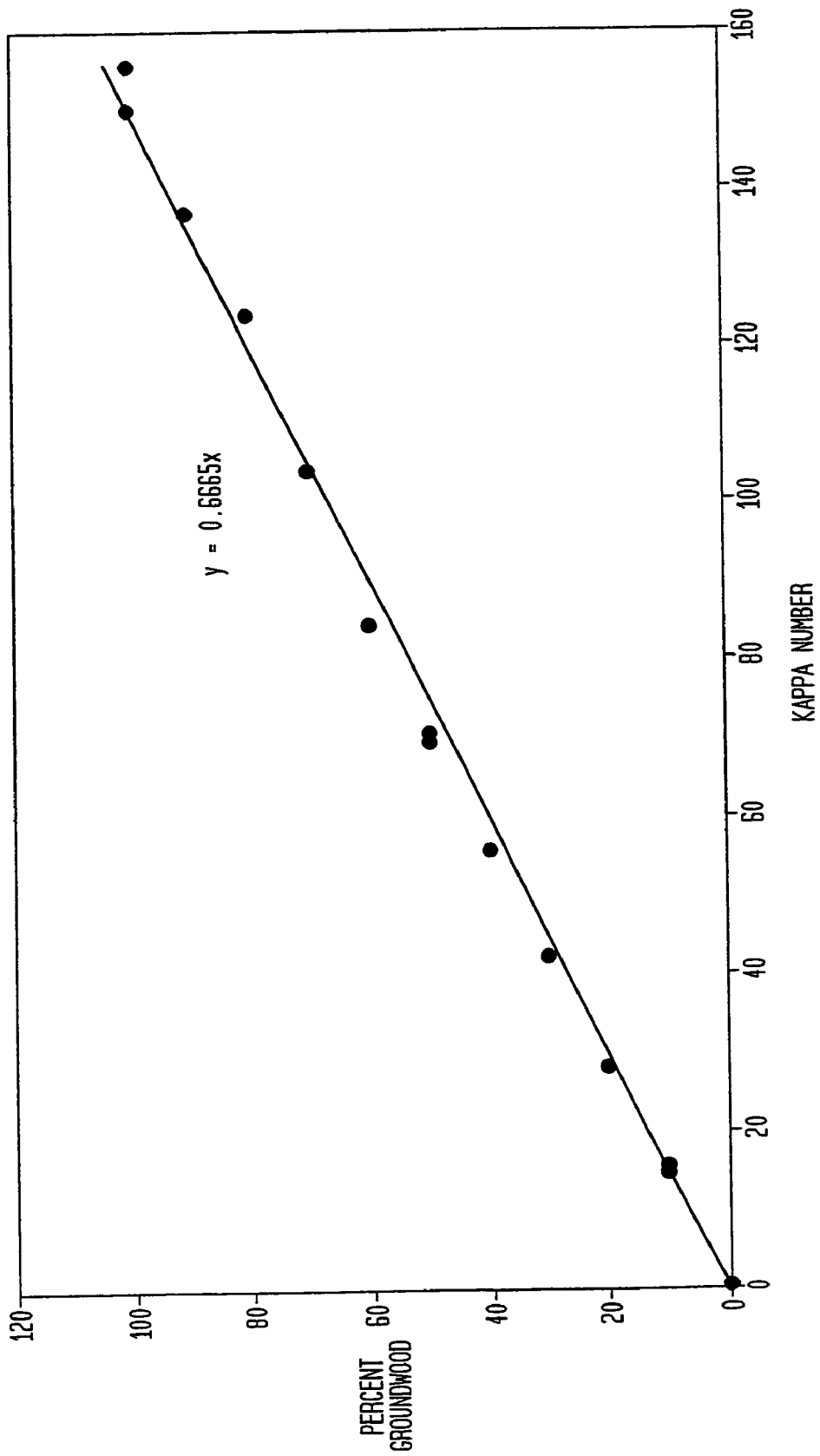
Figure 10:
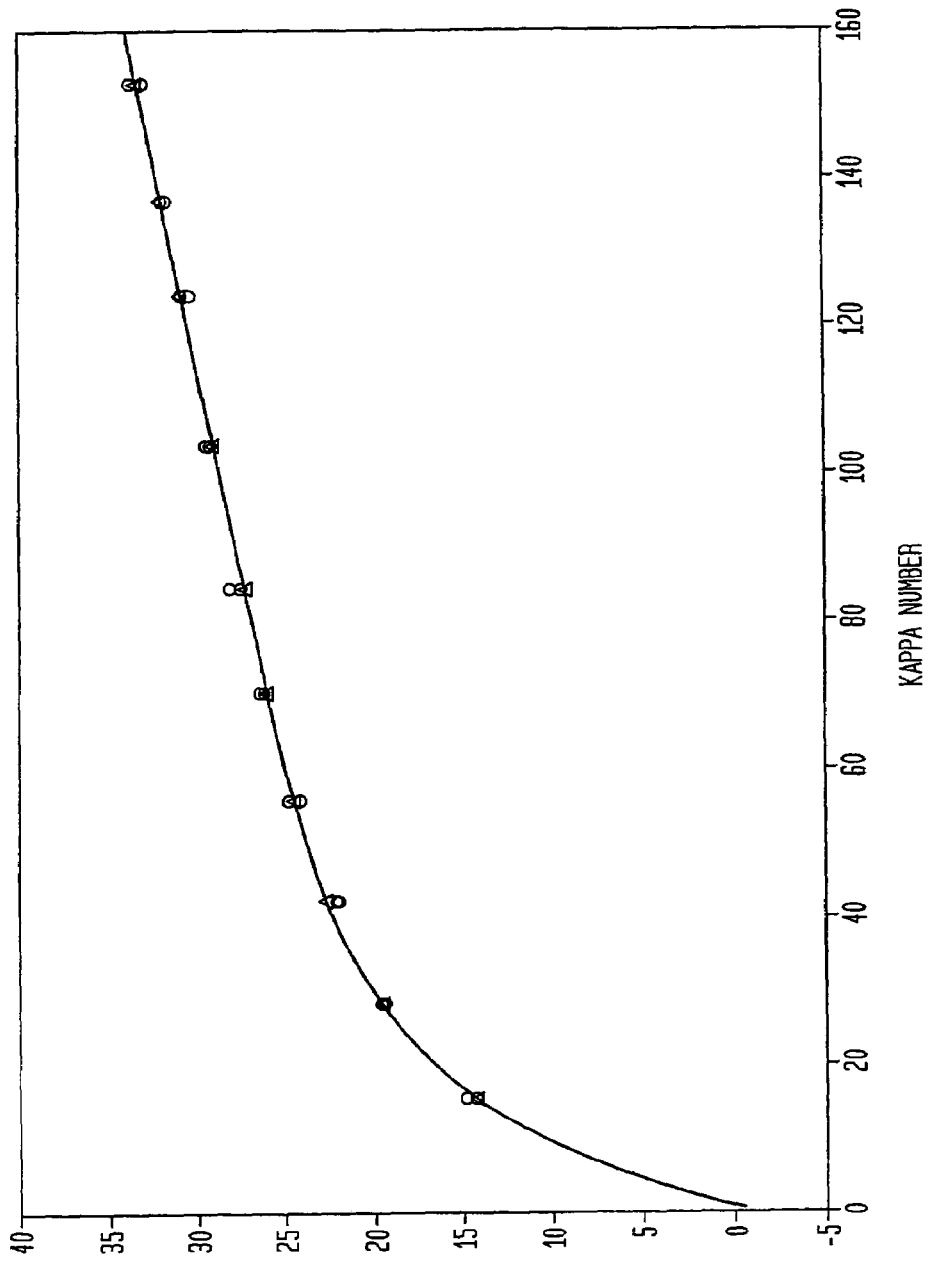
FIG. 10 is a graph illustrating the relationship between a* and Kappa numbers obtained by using TAPPI Method T 236 om-99.
Figure 11:
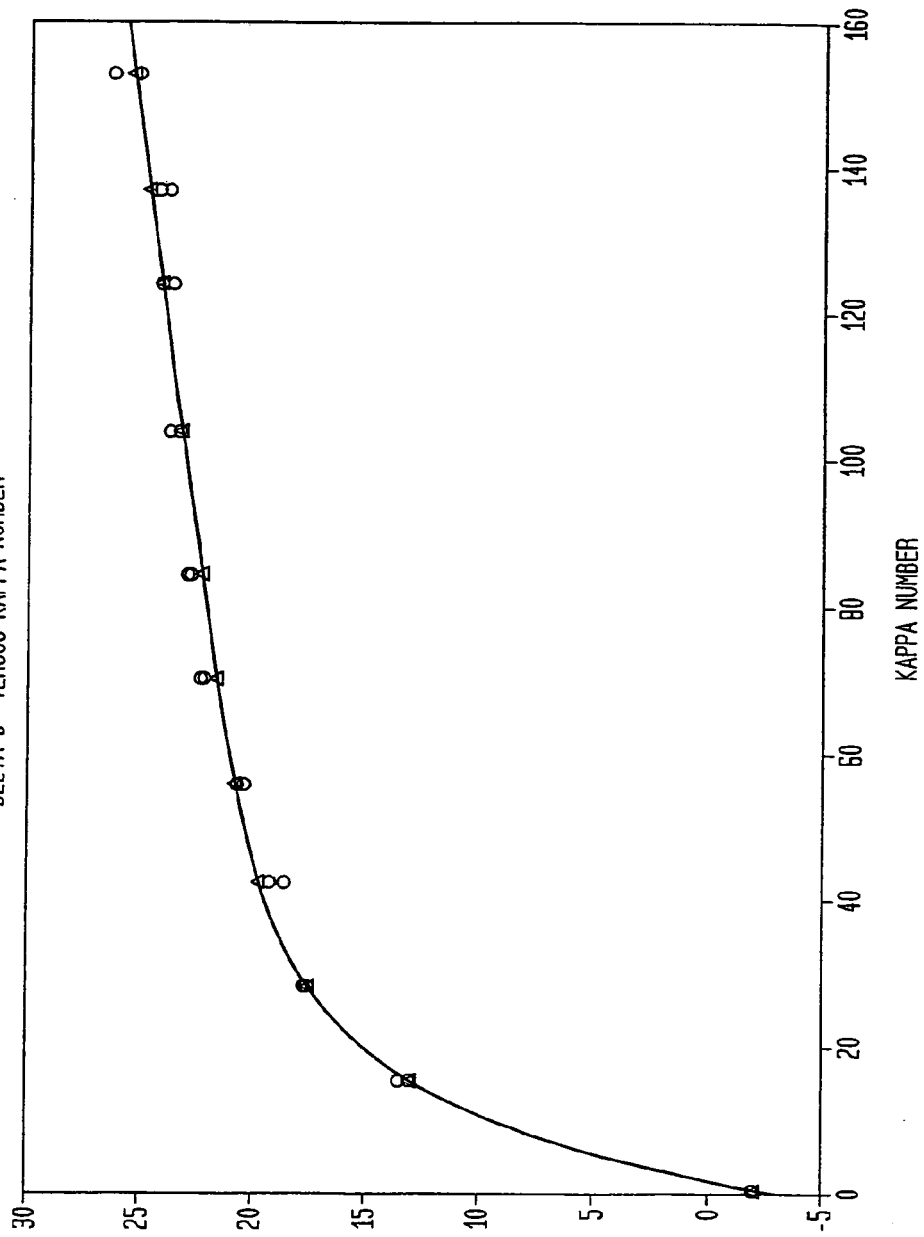
FIG. 11 is a graph illustrating the relationship between delta b* and Kappa numbers obtained by using TAPPI Method T 236 om-99.

Our invention includes a process for utilizing chemically treated groundwood in addition to untreated groundwood. Groundwood includes: GWP (Groundwood Pulp)—Log ground at atmospheric pressure; RMP (Refiner Mechanical Pulp)—Refining of chips at atmospheric pressure in a refiner (in some cases, the refiner outlet may be pressurized); TMP (Thermo Mechanical Pulp)—Thermal pre-treatment and refining of the chips under pressure, with the second refiner stage also under pressure in most cases; CMP (Chemimechanical Pulp)—Chips are pre-treated, usually with sodium sulfite and caustic, then refined without pressure; CTMP (Chemithermo-mechanical Pulp)—Chips are pretreated in the same way as for CMP, but with a lower chemical charge, then refined under pressure; BCTMP (Bleached CTMP)—CTMP which is then bleached in one or two stages with peroxide; APMP (Alkaline Peroxide Mechanical Pulp)—Pulp which is treated with caustic and peroxide before refining; APP (Alkaline Peroxide Pulp)—Similar to APMP, but where the heavy metals are removed from the chips before alkaline-peroxide treatment. For present purposes, GWP, RMP, CMP and CTMP are considered unbleached or untreated groundwood, while BCTMP, APMP and APP are treated or bleached groundwood. Since our delta values do not reflect chemically treated groundwood or groundwood content such as is derived from BCTMP treated waste paper, the process better predicts downstream bleaching requirements, for example. Thus, using TAPPI Method T 236 om-99, the Kappa values for groundwood obtained in FIGS. 5, 7 and 8 overstate the amount of groundwood in the pulp since the chemically treated and BCTMP derived groundwood is reported as untreated groundwood. This reporting error results in the use of a more expensive wastepaper and deinking/bleaching process than would be required if our claimed process would be utilized to produce paper products exhibiting commercially acceptable brightness. These values usually are a 60 to 85 GE brightness value.

Figure 26:
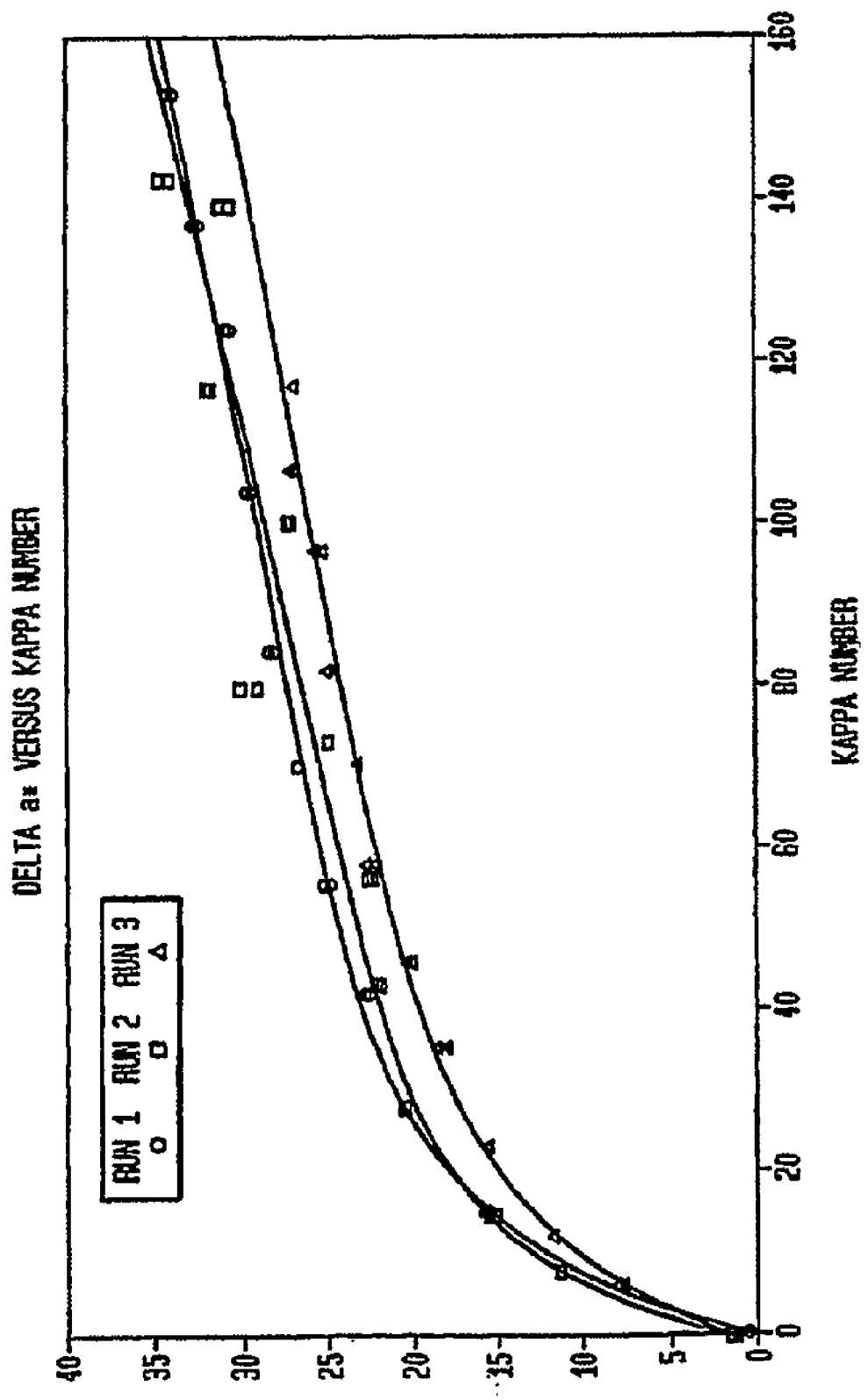
FIG. 26 is a secondary fiber plant flow diagram.

FIG. 26 shows the operation of the secondary fiber plant flow diagram. Waste paper 100 is fed to pulper 101 and charged to drop tanks 1 (102), 2 (103) and drop tank N (104). The ratio of the pulps from the three drop tanks is combined into the blend chest 106. The delta a* or alternatively the delta L* or delta b* or delta brightness testing is conducted on samples coming from the blend chest at point 107. After the delta a* or alternatively delta L* or delta b* or delta brightness values are obtained, the deinking system 108 is adjusted for the severity of ink removal treatment. Similarly, the severity of the bleaching system 109 is adjusted. The deinked and bleached pulp is stored in the finished stock tank 110 from which it is fed into the paper making machines. Advantageously, the testing contemplated herein may be applied to the output of pulper 101 at 111 for example to determine whether its output should be directed to drop tank 1, 2 or drop tank N, thereby greatly stabilizing the groundwood content in each of the tanks. In preferred cases the groundwood content is equalized among the tanks.

The relationship between delta a* and percent groundwood as shown in FIG. 6 was an exponential curve for 0 percent to 30 percent groundwood range and a straight line for greater than 50 percent groundwood. A possible explanation of this shape was that Gretag-Macbeth spectrophotometer mainly measures the color intensity of the surface of phloroglucinol-stained handsheet. The rapid color development may be assigned principally to the fast reaction between the phloroglucinol and the reactive lignin in the surface of the handsheet. Once most of the reactive lignin in the surface of the handsheet is saturated with phloroglucinol, the reaction slows down quickly and the relationship between color intensity and groundwood content follows a linear function with a much lower slope than the initial stage. This surface phenomena of the staining method may provide a better prediction of bleachability of the groundwood containing pulp than other lignin determination methods.

In one experiment the regular unbleached pulp had the delta a* ranged from 11 to 19 and averaged 13.5 in one deinking process. This corresponds to a groundwood fiber content of 5% to 20%, averaging about 8%. In the trial an improvement was made to control the pulp from the blend chest 106 having a delta a* value in the range of 16–18, and still maintained the same finished product brightness. This corresponded to an increase in groundwood for fiber usage from 8% to about 15%.

It was observed that existing operations in one facility had a groundwood content of 4% to 13% in the wastepaper furnish. For reasons of economy and raw material utilization the groundwood content should be increased to about 15–20% when the deinked pulp from 108 is fed into the bleaching system 109 using a hydrogen peroxide/oxygen/hydrosulfite bleach processes. This typically corresponds to a delta a* value of 16–18 as determined in accordance with the present invention.

In another run the groundwood in waste paper was increased to 17–25%. Thus, previously discarded waste paper could be utilized. At these higher groundwood levels still commercially preferred GE brightness targets of greater than 60 were met.

The following is the procedure for the rapid determination of groundwood in handsheets:

Apparatus/Materials:
   Drying Fan and Sample Stand, available from:
      Georgia-Pacific
      Neenah Technical Center
      920-729-8496
   Gretag-Macbeth Color Eye 3100 Spectrophotometer Settings:
      Reflectance
      Spectral Component Excluded
      UV Component Excluded
      Large Area View
      Measurements with white body
   Glass Plate 5"×5"×¼"
   Timer
   1 Kg weight
   Blotter Stock (Pulp Testing Paper), 8"×8"
   Methanol
   Phloroglucinol Stain Solution
      8.0 g Phloroglucinol, Dihydrate
      100 ml Ethyl Alcohol
      20 ml Concentrated Hydrochloric Acid Notes:
   Light sensitive, store in an amber bottle.
   Solution good for 2 months if protected from light and kept in a sealed container.
   Use extreme caution when using concentrated Hydrochloric Acid.

Specimen Preparation
   A 2 g Handsheet was used for testing

Procedure
1. Calibrate the Gretag-Macbeth 3100.
2. Place the handsheet over the sample port holding it in place with the white body
3. Take an initial color reading, recording the a* value.
4. Set the timer for 5 minutes.
5. Place the handsheet on the glass plate.
6. Dispense 0.30 ml of the Phloroglucinol Stain Solution to the handsheet about 2 inches from its edge.
7. Start the timer.
8. Let the stain spread on the handsheet for 30 seconds. (Note: A 1.5" diameter stain is needed to take the final a* reading.)
9. Place the handsheet between two pieces of blotter stock and press on the stained area with the 1-Kg weight for 5–10 seconds to remove excess stain.
10. Remove the handsheet from between the blotter stock and hang it from the clip that is on the front of the drying fan. The stained side should face the fan.
11. After the 5 minutes is up, take a final a* reading of the stained area being sure that the stained portion of the handsheet covers the entire sample port.
12. The delta a* can be obtained by subtracting initial a* from the final a* reading.
13. For additional repeats the sample glass should be cleaned with methanol and a different portion of blotter stock should be used to remove the excess stain.

The estimated percent groundwood vs. delta a* is set forth in FIG. 3 and the formula derived from FIG. 3 shows that percent groundwood=$(0.8383+0.0504 \text{ delta } a^*)^5$.

Modifications to specific features illustrated above within the spirit and scope of the present invention, set forth in the appended claims, will be readily apparent to those of skill in the art.

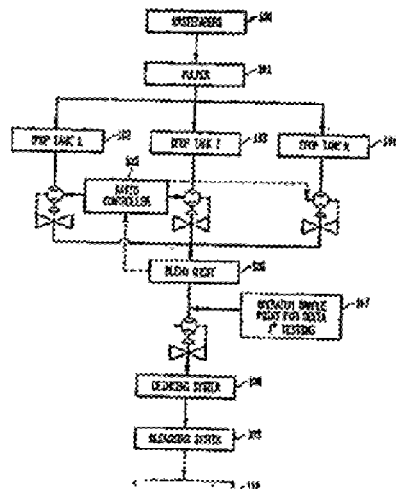

What is claimed is:

1. A method of making cellulosic pulp finished stock of a selected brightness utilizing groundwood containing secondary pulp comprising:
   (a) determining a phloroglucinol color delta for the secondary pulp, by way of (i) taking an initial color reading of a sample, (ii) staining the sample with a phloroglucinol stain, (iii) taking a final color reading of the stained sample, and (iv) calculating the phloroglucinol color delta based on the initial color reading and final color reading;
   (b) selecting a finished pulp brightness suitable for the secondary pulp of step (a) based on the phloroglucinol color delta of the pulp determined in step (a);
   (c) optionally blending the secondary pulp with a supplemental cellulosic pulp;
   (d) optionally de-inking the groundwood containing secondary pulp and supplemental pulp; and
   (e) bleaching the groundwood containing secondary pulp of step (a) and optionally bleaching the supplemental pulp blended in step (d) to achieve a finished stock having the selected brightness.

2. The method according to claim 1, wherein the finished pulp brightness is a GE brightness of at least about 60.

3. The method according to claim 2, wherein the finished pulp brightness is a GE brightness from about 60 to about 85.

4. The method according to claim 1, wherein the phloroglucinol color delta for the pulp is ascertained over a period of less than about 10 minutes.

5. The method according to claim 4, wherein the phioroglucinol color delta for the pulp is ascertained over a period of less than about 7 minutes.

6. The method according to claim 1, wherein the secondary pulp comprises bleached groundwood.

7. The method according to claim 6, wherein the bleached groundwood is BCTMP.

8. The method according to claim 7, wherein the secondary pulp comprises from about 5 to about 20 weight percent BCTMP based on the dry pulp weight.

9. The method according to claim 1, wherein the phloroglucinol color delta of the pulp is selected from delta L*, delta a*, delta b* and delta brightness.

10. The method according to claim 9, wherein the phloroglucinol color delta of the pulp is delta L* and delta L* has a value of from about 0 to about 28.

11. The method according to claim 9, wherein the phloroglucinol color delta of the pulp is delta b* and delta b* has a value of from about −2 to about 17.

12. The method according to claim 9, wherein the phioroglucinol color delta of the pulp is delta brightness and delta brightness has a value of from about 5 to about 31.

13. The method according to claim 9, wherein the phloroglucinol color delta of the pulp is delta a* and delta a* has a value of from about 0 to about 20.

14. The method according to claim 13, wherein delta a* is about 10 or less and a bleaching protocol selected is a delignifying bleaching protocol.

15. The method according to claim 13, wherein delta a* is between 10 and 20 and a bleaching protocol is a non-delignifying bleaching protocol.

16. The method according to claim 1, wherein the phloroglucinol color delta of the pulp is delta a* and delta a* is greater than about 20 and a bleaching protocol is a non-delignifying bleaching protocol.

17. A method of making cellulosic pulp finished stock of a selected brightness utilizing groundwood containing secondary pulp comprising:
(a) selecting a finished stock brightness;
(b) selecting a secondary fiber bleaching protocol;
(c) determining a phloroglucinol color delta for the secondary pulp, by way of (i) taking an initial color reading of a sample, (ii) staining the sample with a phloroglucinol stain, (iii) taking a final color reading of the stained sample, and (iv) calculating the phloroglucinol color delta based on the initial color reading and final color reading;
(d) blending the secondary pulp characterized in step (c) with a supplemental cellulosic pulp based on the phloroglucinol color delta of the pulp to produce a blended pulp including groundwood;
(e) optionally de-inking the groundwood containing blended pulp; and
(f) bleaching the groundwood containing blended pulp following the selected secondary fiber bleaching protocol of step (b) to achieve a finished stock having the selected brightness of step (a).

18. The method according to claim 17, wherein the finished stock has a GE brightness of from about 70–80 and the blended pulp has a groundwood content of from about 10 weight percent to about 20 weight percent.

19. The method according to claim 17, wherein the blended pulp has a groundwood content of from about 15 weight percent to about 20 weight percent.

20. The method according to claim 17, wherein the blended pulp has an unbleached groundwood content of from about 8 weight percent to about 18 weight percent.

21. The method according to claim 20, wherein the blended pulp has an unbleached groundwood content of from about 12 weight percent to about 15 weight percent.

22. The method according to claim 17, further comprising maintaining a reservoir of the blended pulp having a groundwood content within a predetermined range.

23. The method according to claim 22, wherein the reservoir of blended pulp is maintained with a groundwood content of between about 10 weight percent and about 20 weight percent.

24. The method according to claim 23, wherein the reservoir of blended pulp is maintained with a groundwood content of between about 15 weight percent and about 20 weight percent.

25. The method according to claim 22, wherein the reservoir of blended pulp is maintained with an unmodified groundwood content of from about 8 weight percent to about 18 weight percent.

26. A method of making cellulosic pulp finished stock of a selected brightness utilizing groundwood containing secondary pulp comprising:
(a) selecting a finished stock brightness;
(b) determining a phloroglucinol color delta for the secondary pulp, by way of (i) taking an initial color reading of a sample, (ii) staining the sample with a phloroglucinol stain, (iii) taking a final color reading of the stained sample, and (iv) calculating the phloroglucinol color delta based on the initial color reading and final color reading;
(c) selecting a bleaching protocol for the secondary pulp based on the phloroglucinol color delta of the pulp determined in step (b);
(d) optionally de-inking the groundwood containing secondary pulp; and
(e) bleaching the secondary pulp following the protocol selected in step (c) to produce the finished stock having the brightness selected in step (a).

27. The method according to claim 26, wherein the phloroglucinol color delta for the secondary pulp is a delta b* of less than about 7 and the bleaching protocol is a delignifying bleaching protocol.

28. The method according to claim 26, wherein the phloroglucinol color delta for the secondary pulp is a delta b* of from about 7 to about 17 and the bleaching protocol selected is a non-delignifying bleaching protocol.

29. The method according to claim 26, wherein the phloroglucinol color delta for the secondary pulp is a delta b* of greater than about 17 and the bleaching protocol selected is a non-delignifying bleaching protocol.

30. The method according to claim 26, wherein the phloroglucinol color delta for the secondary pulp is a delta L* of less than about 14 and the bleaching protocol selected is a delignifying bleaching protocol.

31. The method according to claim 26, wherein the phloroglucinol color delta for the secondary pulp is a delta L* of from about 14 to about 28 and the bleaching protocol selected is a non-delignifying bleaching protocol.

32. The method according to claim 26, wherein the phloroglucinol color delta for the secondary pulp is a delta L* of greater than about 28 and the bleaching protocol is a non-delignifying bleaching protocol.

33. The method according to claim 26, wherein the phloroglucinol color delta for the secondary pulp is a delta brightness of less than about 21 and the bleaching protocol selected is a delignifying bleaching protocol.

34. The method according to claim 26, wherein the phloroglucinol color delta for the secondary pulp is a delta brightness of from about 21 to about 31 and the bleaching protocol selected is a non-delignifying bleaching protocol.

35. The method according to claim 26, wherein the phloroglucinol color delta for the secondary pulp is a delta brightness of greater than about 31 and the bleaching protocol selected is a non-delignifying bleaching protocol.

36. A method of making a brown stock or a semi-bleached stock comprising:
- (a) determining a phloroglucinol color delta of a feed pulp, by way of (i) taking an initial color reading of a sample, (ii) staining the sample with a phloroglucinol stain, (iii) taking a final color reading of the stained sample, and (iv) calculating the phloroglucinol color delta based on the initial color reading and final color reading; and
- (b) allocating the feed pulp to a papermaking stock selected from the group consisting of (i) brown stock or (ii) semi-bleached stock based on the color delta determined in step (a).

37. A method of making cellulosic pulp finished stock of a selected brightness utilizing groundwood containing pulp comprising:
- (a) determining a phloroglucinol color delta for the pulp, by way of (i) taking an initial color reading of a sample, (ii) staining the sample with a phloroglucinol stain, (iii) taking a final color reading of the stained sample, and (iv) calculating the phloroglucinol color delta based on the initial color reading and final color reading;
- (b) selecting a finished pulp brightness suitable for the pulp of step (a) based on the phloroglucinol color delta of the pulp determined in step (a);
- (c) optionally blending the pulp with a supplemental cellulosic pulp;
- (d) optionally de-inking the groundwood containing pulp and supplemental pulp; and
- (e) bleaching the groundwood containing pulp of step (a) and optionally bleaching the supplemental pulp blended in step (c) to achieve a finished stock having the selected brightness.

38. A method of making cellulosic pulp finished stock of a selected brightness utilizing groundwood containing pulp comprising:
- (a) selecting a finished stock brightness;
- (b) selecting a fiber bleaching protocol;
- (c) determining a phioroglucinol color delta for the pulp, by way of (i) taking an initial color reading of a sample, (ii) staining the sample with a phloroglucinol stain, (iii) taking a final color reading of the stained sample, and (iv) calculating the phloroglucinol color delta based on the initial color reading and final color reading;
- (d) blending pulp characterized in step (c) with a supplemental cellulosic pulp based on the phloroglucinol color delta of the pulp characterized in step (c) to produce a blended pulp including groundwood;
- (e) optionally de-inking the groundwood containing blended pulp; and
- (f) bleaching the groundwood containing blended pulp following the selected fiber bleaching protocol of step (b) to achieve a finished stock having the selected brightness of step (a).

39. A method of making cellulosic pulp finished stock of a selected brightness utilizing groundwood containing pulp comprising:
- (a) selecting a finished stock brightness;
- (b) determining a phloroglucinol color delta for the pulp, by way of (i) taking an initial color reading of a sample, (ii) staining the sample with a phloroglucinol stain, (iii) taking a final color reading of the stained sample, and (iv) calculating the phloroglucinol color delta based on the initial color reading and final color reading;
- (c) selecting a bleaching protocol for the pulp based on the phloroglucinol color delta of the pulp determined in step (b);
- (d) optionally de-inking the groundwood containing pulp; and
- (e) bleaching the pulp following the protocol selected in step (c) to produce the finished stock having the brightness selected in step (a).

* * * * *

UNITED STATES PATENT AND TRADEMARK OFFICE
CERTIFICATE OF CORRECTION

PATENT NO. : 7,074,299 B2
APPLICATION NO. : 10/425856
DATED : July 11, 2006
INVENTOR(S) : Henry Chou et al.

It is certified that error appears in the above-identified patent and that said Letters Patent is hereby corrected as shown below:

The title page should be deleted and substitute therefore the attached title page.

Drawings:

Delete "Fig. 25" to --Fig. 26--; and change "Fig. 26" to --Fig. 25-- as shown on the attached pages.

In Col. 7, line 33, delete" brightnesss*" and insert --brightness--;
In Col. 8, line 66, delete "a" after "exhibiting";
In Col. 9, line 24, delete "," before "dihydrate";
In Col. 9, line 44, insert --of-- after "content";
In Col. 11, line 20, delete "a" after "using";
In Col. 11, line 49, delete "," before "Dihydrate"
In Col. 11, line 60, delete "Preparation" and insert --Preparation:--;
In Col. 11, line 61, delete "Procedure" and insert --Procedure:--;
In Col. 11, line 64, insert --.-- after "body";
In Col. 12, line 60 (Claim 5), delete "phioro-" and insert --phloro--;
In Col. 13, line 13 (Claim 12), delete "phioro-" and insert --phloro--; and
In Col. 14, line 49 (Claim 31), delete "phioroglucinol" and insert --phloroglucinol--.

Signed and Sealed this

Eighth Day of May, 2007

JON W. DUDAS
*Director of the United States Patent and Trademark Office*

United States Patent
Chou et al.

(12) United States Patent
(10) Patent No.: US 7,074,299 B2
(45) Date of Patent: Jul. 11, 2006

(54) PROCESS FOR USING A PHLOROGLUCINOL COLOR DELTA TO CONTROL BLENDING, DEINKING AND BLEACHING OF GROUNDWOOD-CONTAINING SECONDARY PULP

(75) Inventors: Henry Chou, Neenah, WI (US); Hazen C. Thomas, Green Bay, WI (US); Andrew C. Palm, Menasha, WI (US); Terry P. Witkowski, Neenah, WI (US); Robert J. Clausing, Neenah, WI (US); Stephanie Keen, Appleton, WI (US); David J. DiPietro, Appleton, WI (US)

(73) Assignee: Fort James Corporation, Atlanta, GA (US)

(*) Notice: Subject to any disclaimer, the term of this patent is extended or adjusted under 35 U.S.C. 154(b) by 310 days.

(21) Appl. No.: 10/425,856

(22) Filed: Apr. 29, 2003

(65) Prior Publication Data
US 2004/0079497 A1 Apr. 29, 2004

Related U.S. Application Data

(60) Provisional application No. 60/377,068, filed on May 1, 2002.

(51) Int. Cl.
D21C 5/02 (2006.01)
D21C 9/10 (2006.01)
G01N 21/25 (2006.01)
D21H 11/08 (2006.01)
D21H 11/14 (2006.01)

(52) U.S. Cl. ............... 162/49; 162/4; 162/62

(58) Field of Classification Search ............ 162/6, 162/49, 40, 4, 62, 238; 209/509, 580, 155
See application file for complete search history.

(56) References Cited

U.S. PATENT DOCUMENTS

| | | | |
|---|---|---|---|
| 5,013,404 A * | 5/1991 | Christiansen et al. | 162/72 |
| 5,562,803 A | 10/1996 | Wang et al. | 162/5 |
| 5,672,247 A * | 9/1997 | Pangalos et al. | 162/65 |
| 5,736,004 A * | 4/1998 | Pangalos et al. | 162/49 |
| 5,755,926 A | 5/1998 | Hankins et al. | 162/6 |
| 5,883,233 A * | 3/1999 | Catlin et al. | 534/689 |
| RE36,424 E | 12/1999 | Clement | 162/5 |
| 6,010,593 A | 1/2000 | Eymin Petot Tourtollet et al. | 162/4 |
| 6,019,872 A | 2/2000 | Kurrle | 162/140 |
| 6,153,300 A * | 11/2000 | Stromberg et al. | 428/393 |
| 6,273,994 B1 * | 8/2001 | Creber et al. | 162/49 |

* cited by examiner

Primary Examiner—Steven P. Griffin
Assistant Examiner—Anna L. Kinney
(74) Attorney, Agent, or Firm—Michael W. Ferrell

(57) ABSTRACT

A method of processing papermaking fiber includes characterizing the initial color of the pulp and the color of the pulp after treatment with a phloroglucinol stain. The color response of the pulp to the stain has been found to be a better indicator of processing needs for secondary pulps in particular and in any event is selective for untreated groundwood as opposed to conventional groundwood identification methods. The color difference is used to target a suitable product for the pulp, to aid in bleaching/deinking strategy or to enable optimization of fiber blending for particular products. In a preferred embodiment the process includes determining changes in CIE L*, a*, b* and brightness values before and after staining of the pulp.

39 Claims, 26 Drawing Sheets